(12) United States Patent
Ahmed

(10) Patent No.: US 10,874,251 B2
(45) Date of Patent: Dec. 29, 2020

(54) SYSTEM AND METHOD FOR IMPROVING CHARCOAL COMBUSTION FOR COOKING

(71) Applicant: W.C. BRADLEY CO., Columbus, GA (US)

(72) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 0 days.

(21) Appl. No.: 14/997,100

(22) Filed: Jan. 15, 2016

(65) Prior Publication Data

US 2016/0206146 A1 Jul. 21, 2016

Related U.S. Application Data

(60) Provisional application No. 62/103,928, filed on Jan. 15, 2015.

(51) Int. Cl.
*A47J 37/07* (2006.01)

(52) U.S. Cl.
CPC ....... *A47J 37/0704* (2013.01); *A47J 37/0786* (2013.01)

(58) Field of Classification Search
CPC ........ A47J 37/0786; A47J 27/04; A47J 27/60; A47J 37/1295; A47J 37/067; A47J 37/0704
USPC ......... 99/444, 400, 413, 450, 410, 417, 418; 126/167, 168, 152 B, 25 R, 59, 9 R
See application file for complete search history.

(56) References Cited

U.S. PATENT DOCUMENTS

| | | | | |
|---|---|---|---|---|
| 2,815,530 A | * | 12/1957 | Alexander | A22C 17/006 426/421 |
| 3,127,888 A | * | 4/1964 | Burnham, Jr. | A47J 37/0786 126/25 R |
| 3,199,438 A | * | 8/1965 | Myler | A47J 37/041 248/175 |
| 3,598,102 A | * | 8/1971 | Fuss | A47J 37/0786 126/25 R |
| 3,807,380 A | * | 4/1974 | Pasin | A47J 37/0786 126/25 R |
| 4,034,662 A | * | 7/1977 | McLane | A47J 37/0704 126/25 A |

(Continued)

FOREIGN PATENT DOCUMENTS

| | | |
|---|---|---|
| CN | 201012050 Y | 1/2008 |
| CN | 103169389 A | 6/2013 |

(Continued)

OTHER PUBLICATIONS

Product page for Deluxe Charcoal Box Grill Model No. 12301672, available at http://www.charbroil.com/deluxe-charcoal-box-grill?gclid=CjwKEAjwuPi3BRClk8TyyMLloxgSJAAC0XsjEwosRpdPD2VZ2rHUqX8EFeae9508EOLI8BVMS4FCnRoCJQzw_wcB. Publication date unknown but admitted as prior art.

(Continued)

*Primary Examiner* — Jimmy Chou
(74) *Attorney, Agent, or Firm* — David G. Woodral; GableGotwals

(57) ABSTRACT

A charcoal pan includes a supporting surface for supporting a quantity of charcoal beneath a cooking grate, and a plurality of diffusers that transport air from underneath the supporting surface to an area above at least a portion of the quantity of charcoal.

5 Claims, 27 Drawing Sheets

(56) References Cited

U.S. PATENT DOCUMENTS

| | | | |
|---|---|---|---|
| 4,121,510 A * | 10/1978 | Frederick | A47J 36/04 219/733 |
| 4,416,248 A | 11/1983 | Schlosser | |
| 4,503,835 A * | 3/1985 | Williams | A47J 37/079 126/25 B |
| 4,535,748 A * | 8/1985 | Hunerwadel | A47J 37/06 126/25 B |
| 4,539,973 A * | 9/1985 | Hait | A47J 37/0763 126/43 |
| 4,603,052 A * | 7/1986 | El-Hag | A47J 36/022 426/113 |
| RE32,288 E * | 11/1986 | Berger | A47J 37/067 29/897.15 |
| 4,667,651 A * | 5/1987 | Groeneweg | F24C 1/16 126/25 A |
| 4,777,927 A * | 10/1988 | Stephen | A47J 37/0704 126/25 R |
| 4,930,491 A * | 6/1990 | Purello | A47J 37/0704 126/25 R |
| 4,958,618 A * | 9/1990 | Davidson | A47J 37/0768 126/25 R |
| D311,339 S * | 10/1990 | Weed | D7/359 |
| 5,070,777 A * | 12/1991 | Novak | A47J 37/0786 126/25 R |
| 5,105,725 A * | 4/1992 | Haglund | A47J 37/0704 126/25 R |
| 5,111,803 A * | 5/1992 | Barker | A47J 37/0713 126/41 R |
| 5,168,796 A * | 12/1992 | Porton | A47J 37/0781 108/50.13 |
| 5,168,860 A * | 12/1992 | Kibourian | A47J 37/0754 126/15 A |
| 5,211,105 A * | 5/1993 | Liu | A47J 37/01 126/348 |
| 5,226,405 A * | 7/1993 | Snow | A47J 37/079 126/163 R |
| D344,434 S * | 2/1994 | Endara | D7/402 |
| 5,347,978 A * | 9/1994 | Zuran | A47J 37/067 126/25 R |
| 5,363,751 A * | 11/1994 | Prestigiacomo | A47J 37/0786 99/425 |
| 5,367,951 A * | 11/1994 | Purvis | A47J 37/067 99/446 |
| 5,447,097 A * | 9/1995 | Rhee | A47J 37/0786 99/444 |
| 5,453,574 A * | 9/1995 | Zuran | A47J 37/067 126/25 R |
| 5,481,965 A | 1/1996 | Kronman | |
| 5,524,610 A * | 6/1996 | Clark | F24J 2/02 126/25 R |
| 5,535,733 A * | 7/1996 | Hait | A47J 37/0704 126/25 R |
| 5,540,212 A * | 7/1996 | Stroud | A47J 37/0786 126/25 B |
| 5,735,260 A * | 4/1998 | Rimback | A47J 37/0713 126/39 J |
| D404,968 S * | 2/1999 | Lin | D7/409 |
| 5,891,498 A * | 4/1999 | Boehler | A23B 4/052 426/314 |
| 5,996,572 A | 12/1999 | Ilagan | |
| 6,000,389 A * | 12/1999 | Alpert | A47J 37/0713 126/25 R |
| 6,024,081 A * | 2/2000 | Libertini, Jr. | A47J 37/0694 126/14 |
| 6,065,464 A * | 5/2000 | Zajec | A47J 37/0786 126/25 R |
| 6,161,534 A * | 12/2000 | Kronman | A47J 37/07 126/25 R |
| 6,173,644 B1 * | 1/2001 | Krell | A47J 37/0713 126/25 R |
| D446,683 S * | 8/2001 | Pai | D7/402 |
| 6,293,271 B1 * | 9/2001 | Barbour | A47J 27/12 126/25 R |
| D448,604 S * | 10/2001 | Cho | D7/337 |
| 6,520,174 B1 * | 2/2003 | Scigliuolo | A47J 37/0786 126/25 R |
| 6,523,461 B1 | 2/2003 | Johnston et al. | |
| 6,598,598 B1 * | 7/2003 | Bratsikas | A47J 37/067 126/25 R |
| 7,241,466 B2 * | 7/2007 | Dellinger | A47J 37/0786 126/153 |
| D608,146 S * | 1/2010 | Zemel | D7/409 |
| 7,703,386 B1 | 4/2010 | Bourgeois et al. | |
| 7,810,484 B2 * | 10/2010 | Schlosser | A47J 37/067 126/25 R |
| 7,810,487 B2 * | 10/2010 | Johnston | A47J 37/0694 126/152 A |
| 7,946,223 B2 * | 5/2011 | Raichlen | A47J 37/049 99/419 |
| 8,037,879 B2 * | 10/2011 | Murrin | A47J 37/0694 126/25 R |
| D651,043 S * | 12/2011 | Sarnoff | D7/354 |
| D651,465 S * | 1/2012 | Le | D7/354 |
| D658,942 S * | 5/2012 | Borovicka | D7/409 |
| D667,681 S * | 9/2012 | Carsten | D7/354 |
| D668,506 S * | 10/2012 | Zemel | D7/409 |
| 8,387,610 B1 * | 3/2013 | Candelaria, Jr. | A47J 37/049 126/25 R |
| D689,327 S * | 9/2013 | Ortegon | D7/354 |
| 8,635,947 B2 | 1/2014 | Karau | |
| D703,485 S * | 4/2014 | Zemel | D7/409 |
| 8,813,738 B2 * | 8/2014 | Ahmed | A47J 37/0682 126/152 R |
| 8,955,426 B2 * | 2/2015 | Glynn | A47J 27/04 99/422 |
| 9,215,950 B2 * | 12/2015 | Walker | A47J 37/0763 |
| 9,339,145 B1 * | 5/2016 | Owczarzak | A47J 37/0786 |
| 9,554,671 B2 * | 1/2017 | Poon | A47J 37/0694 |
| 2003/0177913 A1 | 9/2003 | Dellinger | |
| 2006/0196492 A1 * | 9/2006 | Whitener | A47J 37/0786 126/25 R |
| 2006/0225725 A1 * | 10/2006 | Rinaldo | F24C 1/16 126/9 R |
| 2006/0236995 A1 * | 10/2006 | Chang | A47J 37/079 126/25 R |
| 2007/0157918 A1 * | 7/2007 | Becker | A47J 37/0704 126/25 R |
| 2007/0277800 A1 * | 12/2007 | Chiang | A47J 37/0704 126/25 R |
| 2007/0277807 A1 * | 12/2007 | Taban | A47J 37/0763 126/275 R |
| 2009/0148801 A1 | 6/2009 | Wedermann | |
| 2010/0199577 A1 * | 8/2010 | Sonneveld | A01G 9/1438 52/173.3 |
| 2011/0061543 A1 * | 3/2011 | Ingrassia | A47J 37/0704 99/340 |
| 2011/0132347 A1 * | 6/2011 | Kim | A47J 37/0763 126/25 R |
| 2011/0283990 A1 * | 11/2011 | Walters | A47J 37/0759 126/25 R |
| 2012/0234308 A1 * | 9/2012 | Faulk | A47J 37/079 126/25 R |
| 2013/0014743 A1 * | 1/2013 | Glanville | A47J 37/0704 126/25 R |
| 2014/0311356 A1 * | 10/2014 | Daniels | A47J 37/0713 99/340 |
| 2014/0360385 A1 * | 12/2014 | Cammon | A47J 37/0704 99/445 |

(56) References Cited

U.S. PATENT DOCUMENTS

| | | | | |
|---|---|---|---|---|
| 2015/0282660 A1* | 10/2015 | Sarvestani | .......... | A47J 37/0786 99/331 |
| 2015/0305560 A1* | 10/2015 | Hamlin | .................. | A47J 36/34 126/25 R |

FOREIGN PATENT DOCUMENTS

| | | | | |
|---|---|---|---|---|
| EP | 2745755 A1 * | 6/2014 | ............ | A47J 37/067 |
| JP | 2002034797 A | 2/2020 | | |
| WO | PCT/US2016/13703 | 3/2016 | | |

OTHER PUBLICATIONS

Product page for Dancook 7000 Box Grill, available at http://http://www.dancook.dk/Default.aspx?ID=209. Publication date unknown but admitted as prior art.

Geek With Fire Char-Griller Smoking Pro with Firebox-Mods, smokingmeatfourms.com, Jan. 23, 2008 [retrieved on Feb. 27, 2016]. Retrieved from the internet: <URL: hhttp://www.smokingmeatforums.com/l/58778/char-griller-smokin-pro-with-firebox-mods/40>entire document.

Myhrvold et al., "Modernist Cuisine", "Techniques and Equipment", pp. 14-17, vol. 2, No. 7, Publisher: The Cooking Lab.

Extended European Search Report prepared for EPO Application No. 16738009.6, dated Sep. 24, 2018, prepared by the European Patent Office.

Search Report by National Intellectual Property Administration, P.R. China prepared in Chinese Patent Application No. 201680015798.4 dated Sep. 10, 2019.

China Search Report dated Jun. 1, 2020 for CN Appl. No. 201680015798.4 prepared by National Intellectual Property Administration, P.R.

* cited by examiner

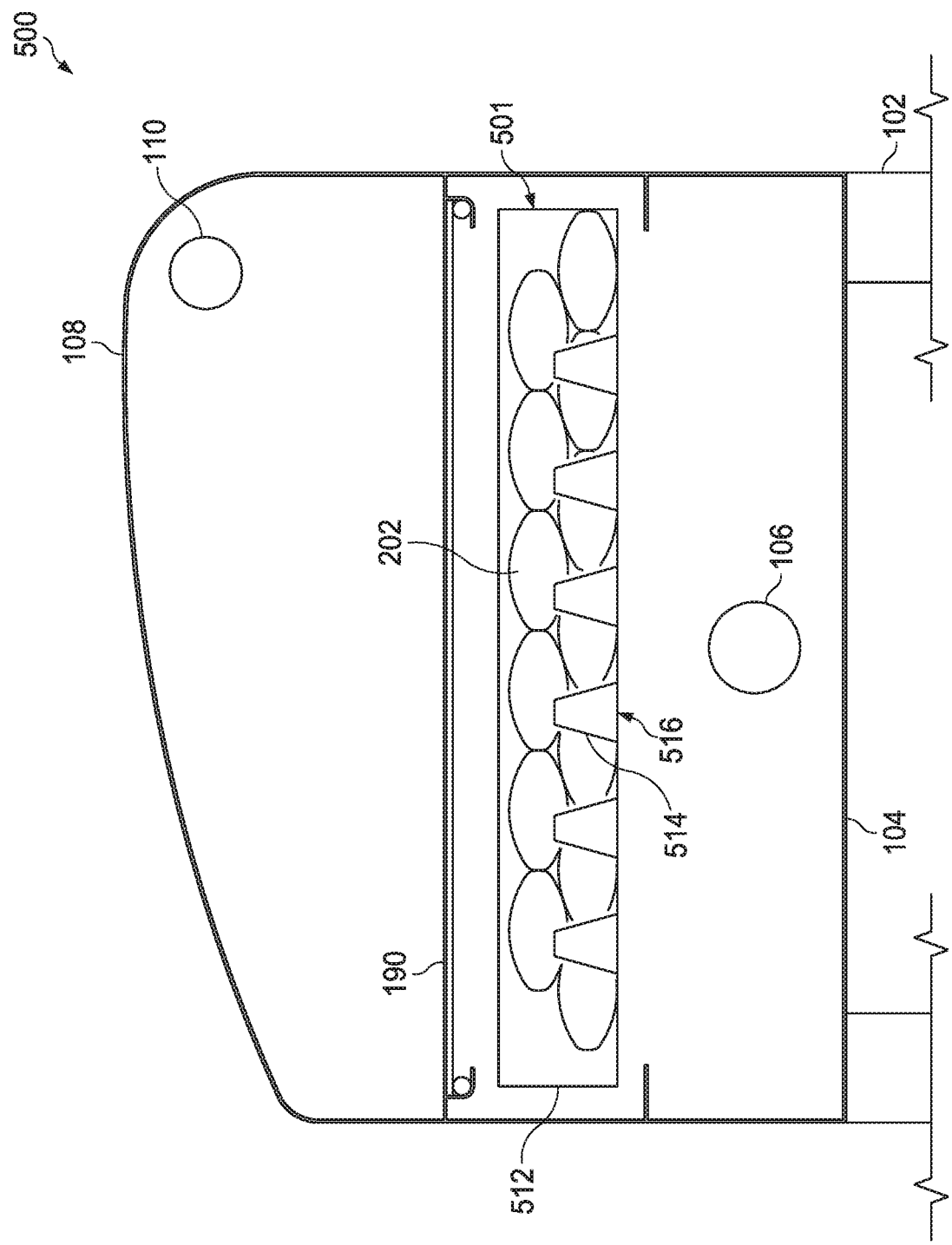

SYSTEM AND METHOD FOR IMPROVING CHARCOAL COMBUSTION FOR COOKING

CROSS-REFERENCE TO RELATED CASES

This application claims the benefit of U.S. provisional patent application Ser. No. 62/103,928 filed on Jan. 15, 2015, and incorporates such provisional application by reference into this disclosure as if fully set out at this point.

FIELD OF THE INVENTION

This disclosure relates to cooking with solid fuels in general and, more particularly, to an improved device and method for combustion of solid cooking fuels.

BACKGROUND OF THE INVENTION

Portable charcoal grills for cooking food outdoors have been used or manufactured since at least 1948. Since this time construction of such grills has remained largely unchanged with respect to the physical relationship between the charcoal fuel, the supply of air for combustion, and the placement of food. An example grill can be seen in U.S. Pat. No. 4,416,248 to Schlosser which places in a bowl shaped space a set of bars on which charcoal is placed, called a fire grate. An air opening is provided below the fire grate. And another set of bars forming a grate above the fire grate on which food is placed is called the cooking grate. With variations as to the shape of the space in which these elements are placed (which can be rectangular rather than circular) this approach has been widely used.

In the case of the approach where air is admitted to the charcoal bed from below, the charcoal burns from the bottom of the briquette (or fragment) to the top. This means that during most of the burning life of the piece of charcoal half or more of the released radiant energy is directed downward and away from the food being cooked. Further, with combustion air provided from the bottom, a relatively hotter area of the fire will generate a flue effect that draws in more air for combustion making that area even hotter. Therefore, there is a tendency for heat to become more and more uneven as the fire develops. The nature of the action is well described in *Modernist Cuisine*, Vol. 2 by Myhrvold, et al., Chapter 7, pp. 14-17.

When air is entrained from below the subsequent thermal draft develops locally high air velocities around the pieces of burning charcoal (like a bellows) with consequently developed small flames. These flames ignite the fat that extracted from cooking food causing flare-ups with undesirable sustained flame contact with the food. Because of these flare-ups the charcoal bed is located spaced substantially far apart from the cooking grate. This results in less efficient cooking with limited sear marks, and requires continuous attention in the cooking process. Further, flare-up conditions can carry ash from charcoal to food.

What is needed is a system and method for addressing the above and related concerns.

SUMMARY OF THE INVENTION

The invention of the present disclosure, in one aspect thereof, comprises a charcoal pan for use within a grill. The charcoal pan includes a supporting surface for supporting a quantity of charcoal beneath a cooking grate, and a plurality of diffusers that transport air from underneath the supporting surface to an area above at least a portion of the quantity of charcoal.

In some embodiments, the plurality of air diffusers comprise a plurality of parallel peaked structures rising from the supporting surface and having at least one air gap facing upward from the peaks thereof. The air gaps may be at least 0.5 inches above the supporting surface and the plurality of parallel peaked structures may be spaced apart from 4 inches to 5 inches.

The the plurality of air diffusers may comprise a plurality of parallel peaked structures rising from the supporting surface, each peaked structure having at least one air opening defined in a sidewall below the peak. The supporting surface may bounded by a boundary wall defining at least one air opening therein, the at least one air opening being situated above the supporting surface. In some embodiments, there is a slidable closure on each of the plurality of air diffusers. Each slidable closure defines an opening corresponding with the at least one air opening of the respective air diffuser and is selectively slidable to alter a degree of overlap between the respective adjacent openings to alter airflow volume of the diffuser.

In another embodiment, the plurality of air diffusers comprises a plurality of open-topped cones rising from the supporting surface. The open topped cones may each have a cover that is spaced apart from the top of the cone to define an air gap between the cover and the cone.

The invention of the present disclosure, in another aspect thereof, comprises a charcoal pan having a flat support surface bounded by an outer wall, and a plurality of air conduits defining air passageways from below the flat support surface and terminating a predetermined distance above the flat support surface.

In some embodiments, the outer wall defines a plurality of air openings around a periphery of the flat support surface. The plurality of air conduits may comprises a plurality of parallel spaced apart peaked structures rising from the flat support surface and having an air opening on the peaks thereof. In another embodiment the plurality of air conduits comprises a plurality of double walled structures rising from the flat support surface and joining at a peak. The double walled structures may define air openings in the walls. A slidable closure may selectively partially or completely cover the air openings in the walls.

In another embodiment, the plurality of air conduits comprises a plurality of hollow and opened topped conic structures rising from the flat support surface. A covering may be spaced apart from the top of each of the open topped conic structures.

The invention of the present disclosure, in another embodiment thereof, comprises a method of providing a flat support surface bounded around the outside to contain a quantity of charcoal below a cooking grate, and forming a plurality of air passageways allowing air flow from below the flat support surface to a predetermined level above the flat support surface.

The method may include forming the plurality of air passageways in a repeating equidistantly spaced pattern on the flat support surface. An adjustable closure may be provided on the plurality of air passageways, the adjustable closure having at least selectable positions for complete opening of the air passageways and partial closure of the air passageways. In another embodiment, the method includes providing a spaced apart cover for each of the plurality of air passageways.

BRIEF DESCRIPTION OF THE DRAWINGS

FIG. 5E is a side cutaway view of the grill of FIG. 5A.

DETAILED DESCRIPTION OF THE PREFERRED EMBODIMENTS

Figure 1:
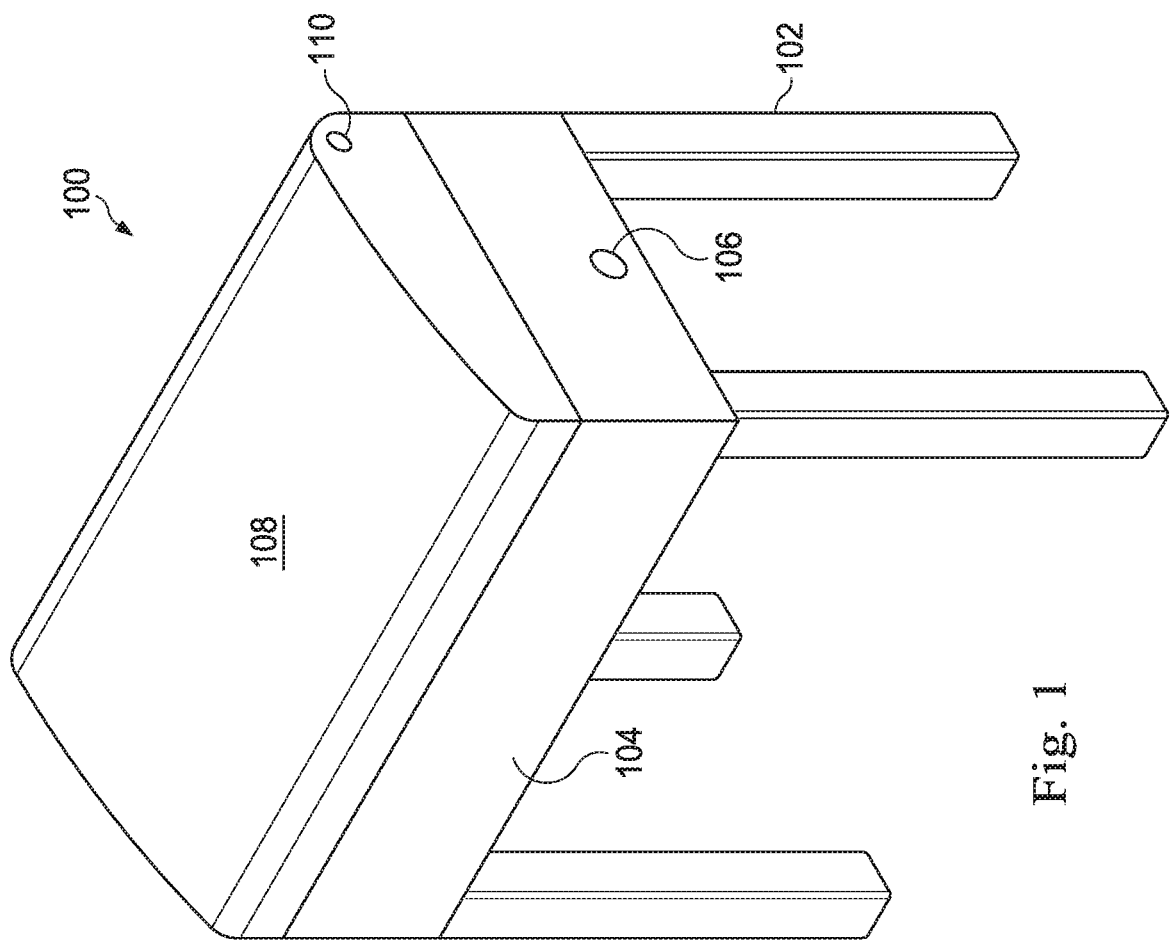
FIG. 1 is a perspective view of an exterior of a cooking grill according to aspects of the present disclosure.

Referring now to FIG. 1, a perspective view of the exterior of a cooking grill 100 is shown. The grill 100 may be a barbecue grill designed for the use of charcoal only, or may be a hybrid gas/charcoal product where a gas burner is used to ignite the charcoal. The grill 100 may also be a convertible device where an interior charcoal container can be removed and the grill 100 be used as a gas grill.

The grill 100 may be mounted on legs 102 but could also be mounted on a wheeled cart or other location. A lower portion is generally configured as a fire box 104. The firebox 104 may provide a combustion air intake 106. The intake 106 is not limited to the location or configuration shown, but may be generally below a level of the internal charcoal bed. An openable lid 108 may be removably fitted to the fire box 104. In some embodiments, the lid 108 is hinged to the fire box 104. The lid 108 may provide an exhaust gas outlet 110. The outlet 110 is not limited to the location or configuration shown. It should also be understood that there may be multiple intakes and outlets in various locations on the firebox 104 and lid 108, respectively. In some embodiments, a gap between the firebox 104 and lid 108 may function as an exhaust outlet.

Figure 2A:
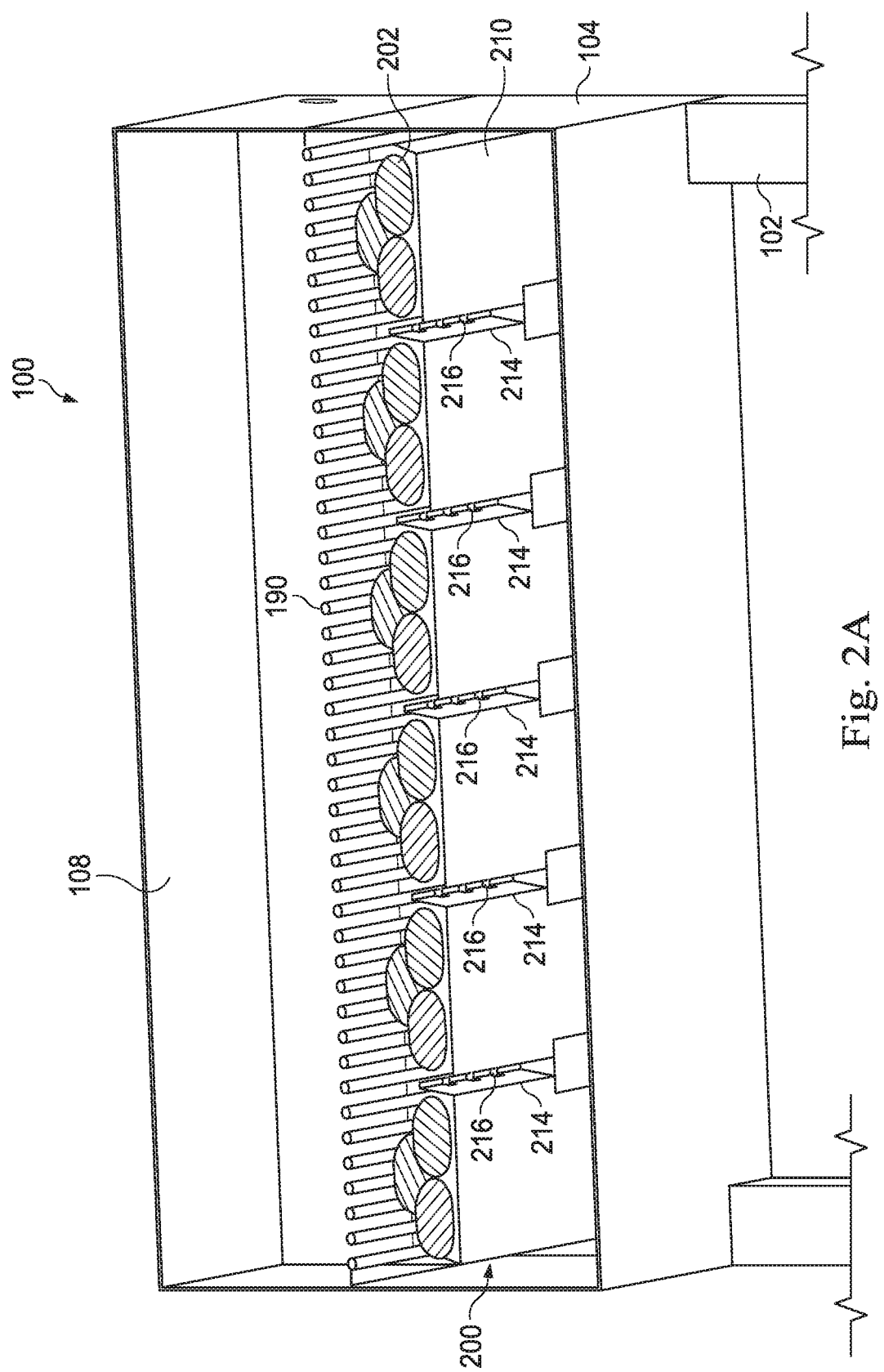
FIG. 2A is an inferior perspective cutaway view of the grill of FIG. 1.
Figure 2B:
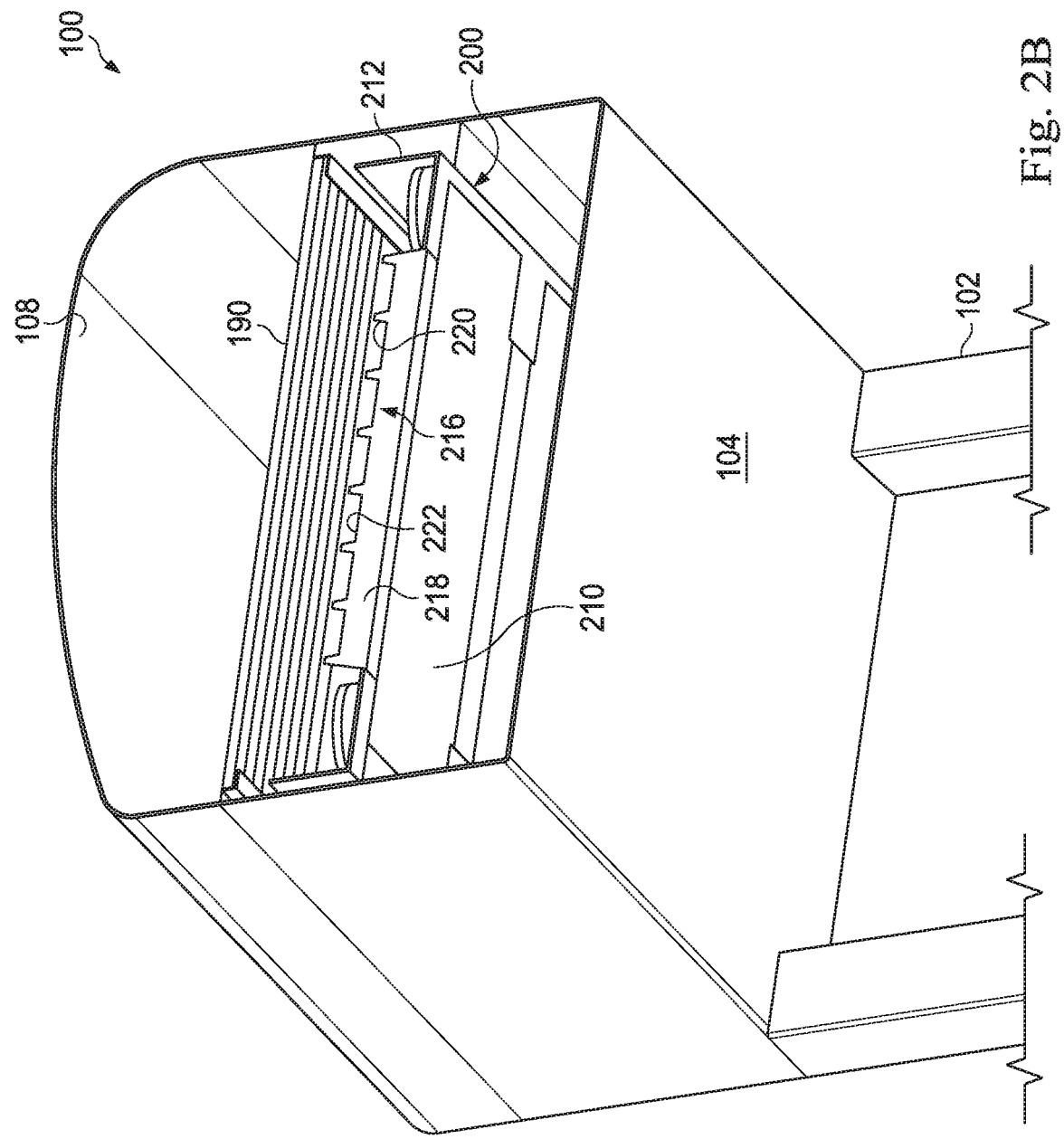
FIG. 2B is an inferior perspective cutaway view of the grill of FIG. 1 rotated approximately 60 degrees from that of FIG. 2.
Figure 2C:
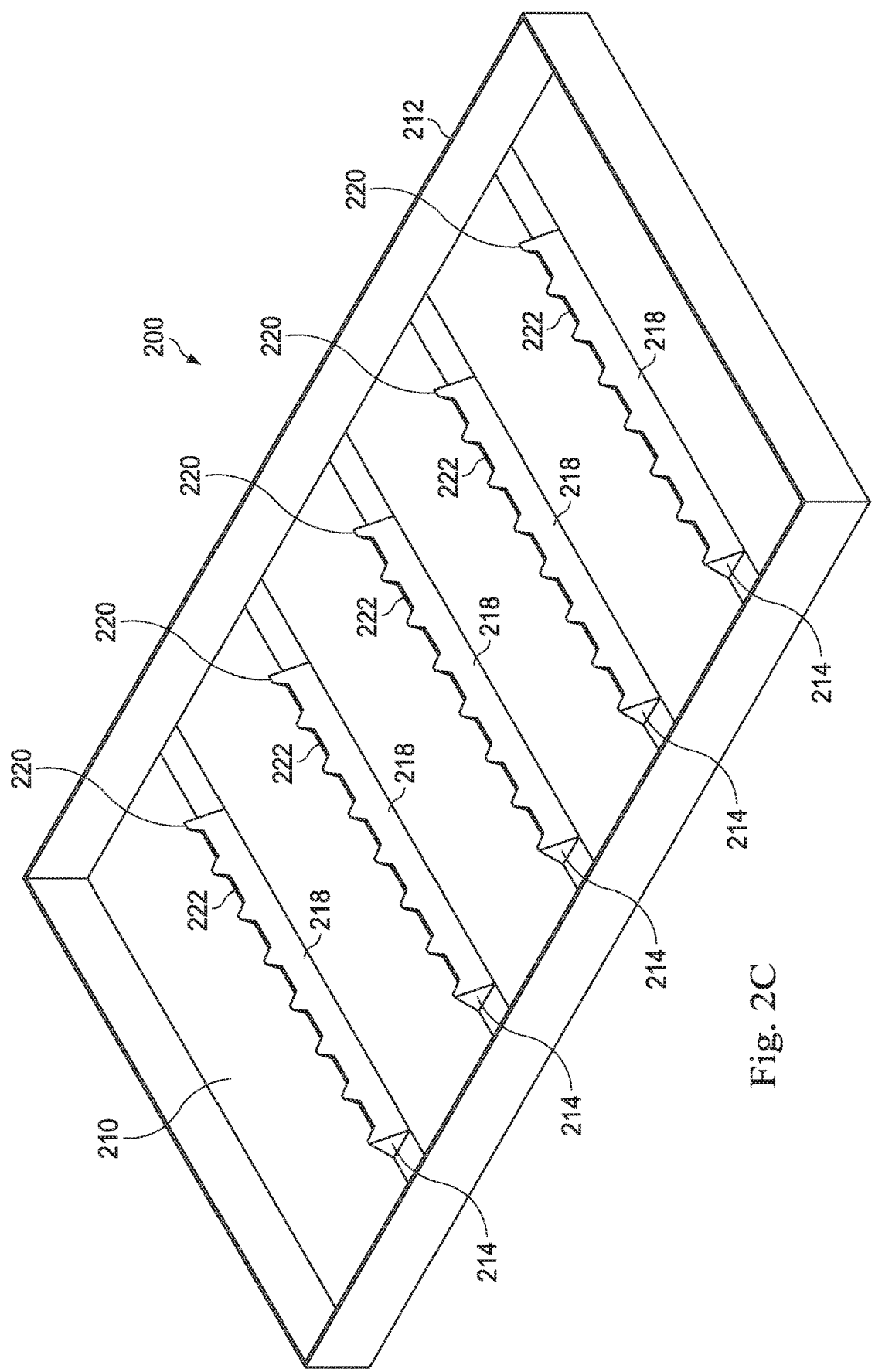
FIG. 2C is a perspective view of a charcoal pan for use with the grill of FIGS. 1-2B.
Figure 2D:
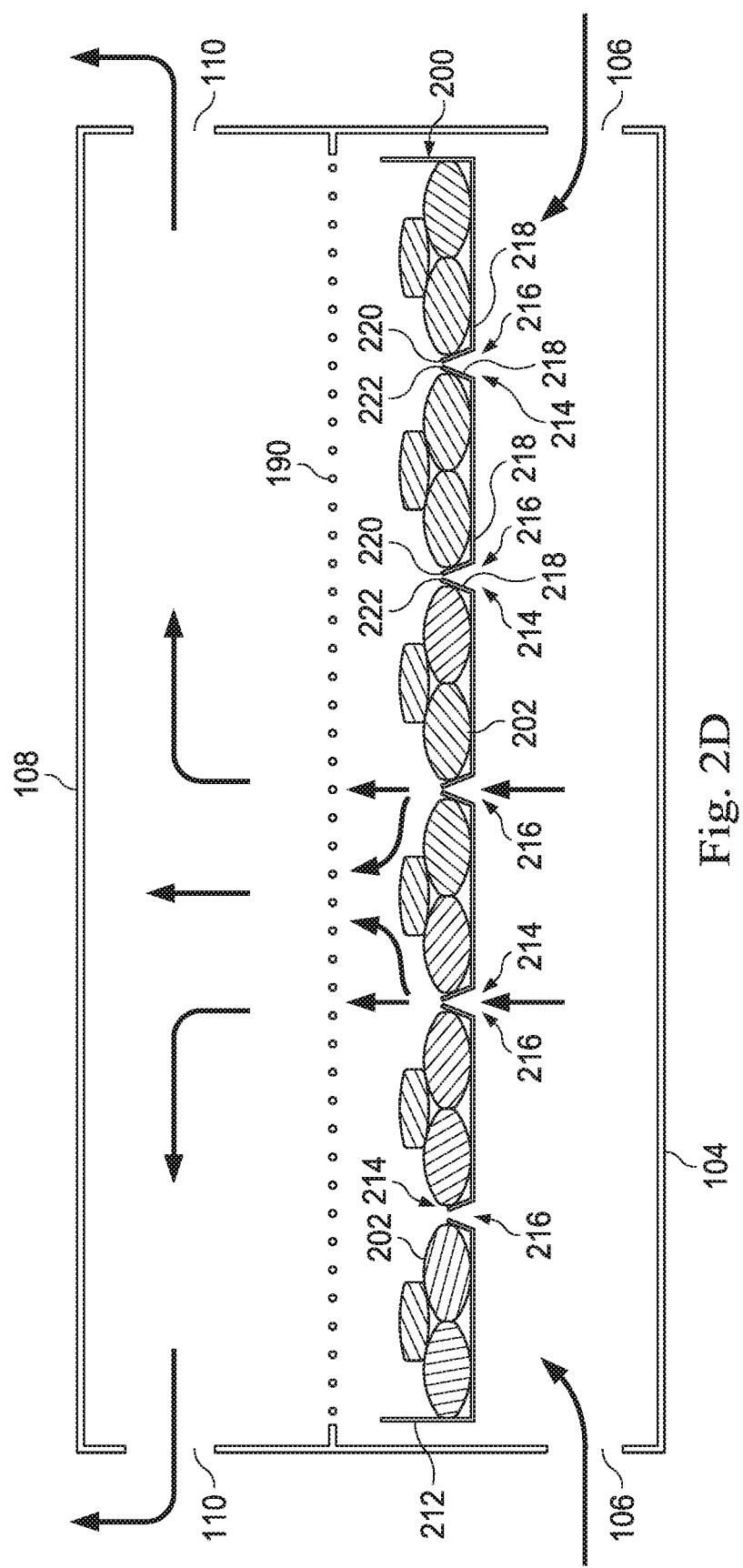
FIG. 2D is a front cutaway view of the grill of FIG. 1.
Figure 2E:
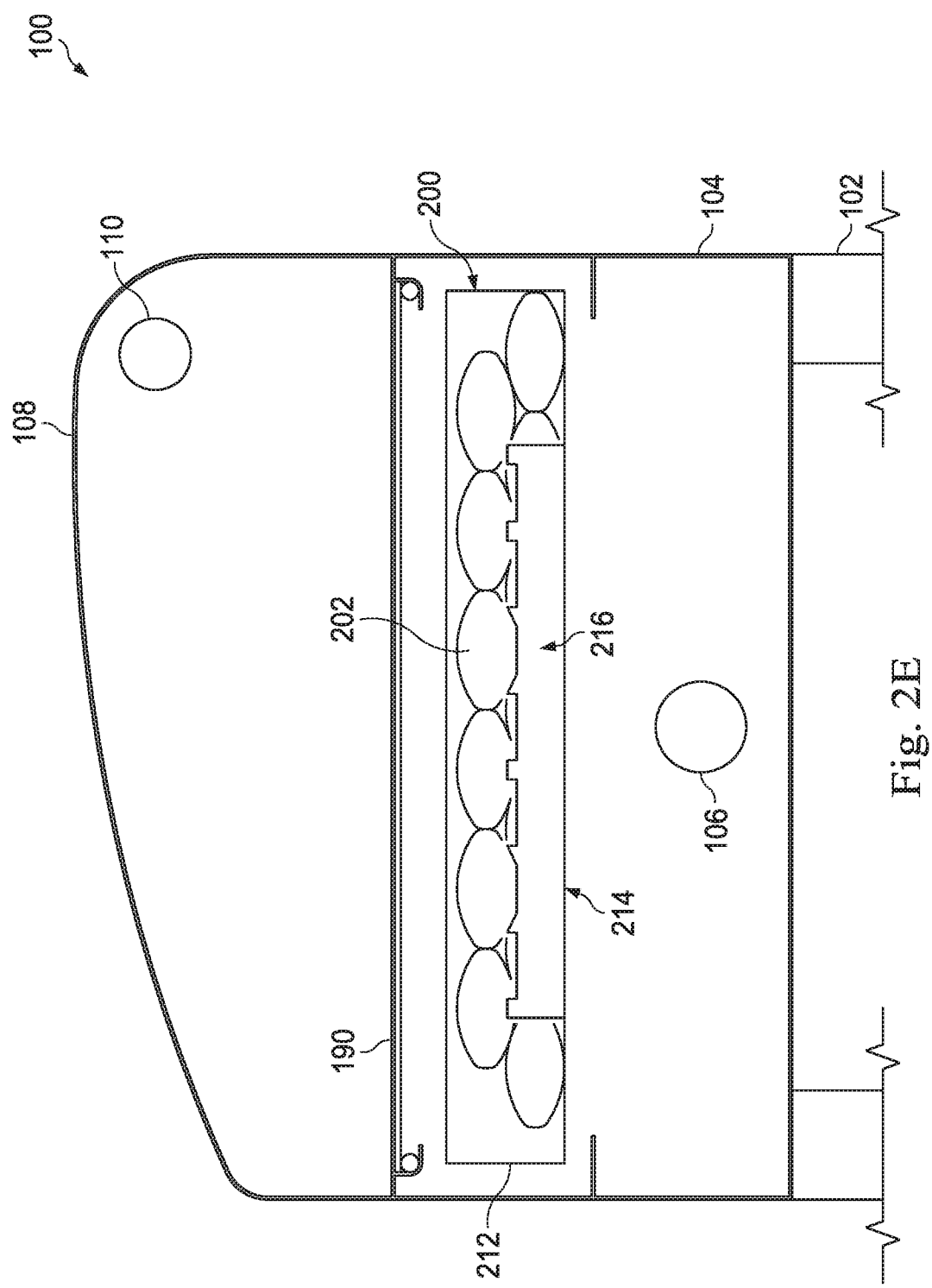
FIG. 2E is a side cutaway view of the grill of FIG. 1.

Referring now to FIG. 2A, an inferior perspective cutaway view of the grill 100 of FIG. 1 according to aspects of the present disclosure is shown. FIG. 2B provides a second inferior perspective cutaway view rotated approximately 60 degrees from Figure A. FIG. 2C provides a perspective view of the charcoal pan 200 for use with the grill 100. FIG. 2D is a front cutaway view of the grill 100 of FIG. 1 and FIG. 2E is a side cutaway view of the grill 100 of FIG. 1. Reference to these figures together illustrates a grill 100 with a charcoal pan 200 that may be placed in the firebox 104 of the grill 100. The charcoal pan 200 may be placed below a food grate 190 and support a bed of charcoal 202. The charcoal bed 202 may comprise lump charcoal or charcoal briquettes.

The charcoal pan 200 provides a solid and generally planar or flat support surface 210. The support surface 210 may be rectilinear in shape or otherwise configured to fit within the firebox 104. It will be appreciated that the charcoal pan 200 may be adapted for grills with a rounded or oval firebox by taking on a round shape itself. The support surface 210 may be bounded around an outer perimeter by a wall 212. The wall 212 may have a height sufficient for aiding in retention of the charcoal bed 202.

Proceeding upwardly from the support surface 210 are a plurality of diffusers 214 that provide a passageway or conduit 216 (best seen in inferior views of FIGS. 2A and 2B and cutaway view of FIG. 2D) for air to pass from below the support surface 210 and above the charcoal bed 202. The diffusers 214 comprise a pair of upwardly angled walls 218 joining at an apex 220 to form a peaked structure. The apex 220 may be interrupted with a plurality of air gaps 222. In another embodiment, a single air gap occupies what would otherwise be the joinder or apex between the angled walls 218.

The air gaps 222 are elevated into the charcoal bed 202 in order to provide air to the side or tops of the individual lumps or briquettes in the charcoal bed 202. This allows the charcoal bed to burn from the top rather than the bottom. Thus, more of the radiant heat is directed upward to the food grate 190 where it can be utilized for cooking. Providing air at or nearer the top of the charcoal bed 202 also reduces flying ash rising to contaminate the food. The heat generated by the burning charcoal bed 202 will provide ample drawing effect of air through the conduits 216 such that no additional motivation is needed.

As best seen in FIG. 2C, the diffusers 214 may be arranged "front to back" on the support surface 210 and in parallel with one another. In another embodiment, the diffusers 214 are arranged side to side in parallel. In further embodiments, the diffusers 214 may form squares or other patterns. In cases where the diffusers 214 are parallel, they may be placed on the support surface such that they are from about 4 inches to about 5 inches apart (between adjacent walls 218 of adjacent diffusers 214). This spacing allows for two standard size charcoal briquettes to fit between the diffusers (as seen in FIG. 2D). The height reached by the upwardly angled walls 218 relative to the support surface 210 before terminating or opening into gaps 222 may be from about 0.5 inches to about 1 inch. A one inch height of the air gaps 222 will allow the air gaps 222 to be at or above the top of a standard charcoal briquette such that air is provided above at least the first layer of briquettes in the charcoal bed 202. In other embodiments the air gaps 222 are even higher to allow larger or deeper charcoal beds. The air gaps 222 may also be lower but at the risk of diminishing performance of the charcoal pan 200 insofar as keeping charcoal briquettes burning from the top and reducing flying ash.

FIG. 2D illustrates exemplary air flow through and around the charcoal bed 202 on the pan 200. Air is drawn in through intakes 106 where in arrives at the bottom of the pan 200 to be drawn upward though air diffusers 214 to feed the burning charcoal bed 202 from above rather than below. Hot gases rise from the charcoal bed 202 and are used for cooking on the cooking grate 190 before being exhausted via outlets 110. The cooking grate 190 can be much closer to the charcoal bed 202 than with previous systems since the charcoal bed 202 burns from the top down. This allows better heat transfer and cooking characteristics, while at the same time reducing flying ash since air is not flowing upward through the burning charcoal bed 202.

Figure 3A:
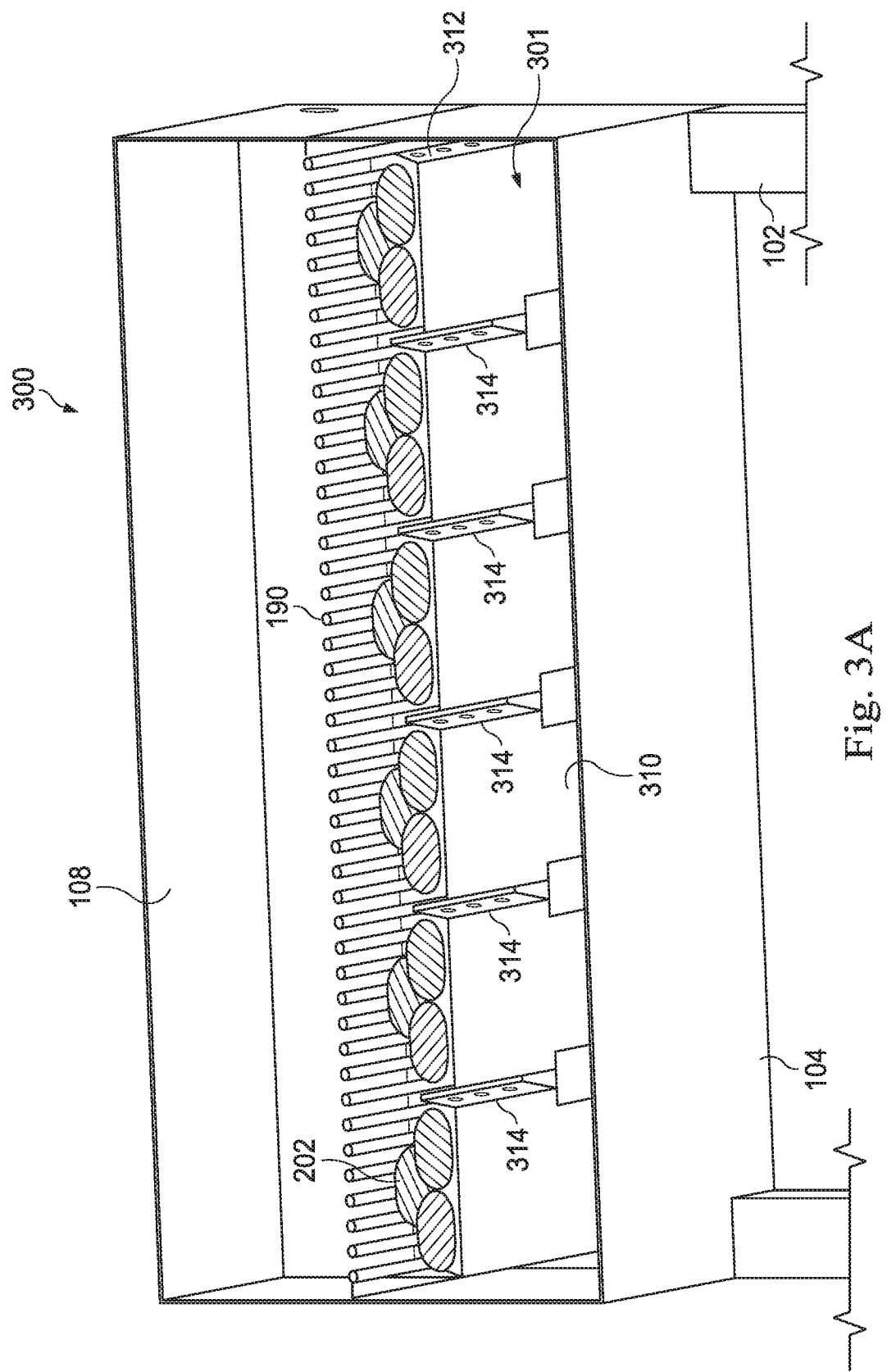
FIG. 3A is an inferior perspective cutaway view of a cooking grill according to aspects of the present disclosure.
Figure 3B:
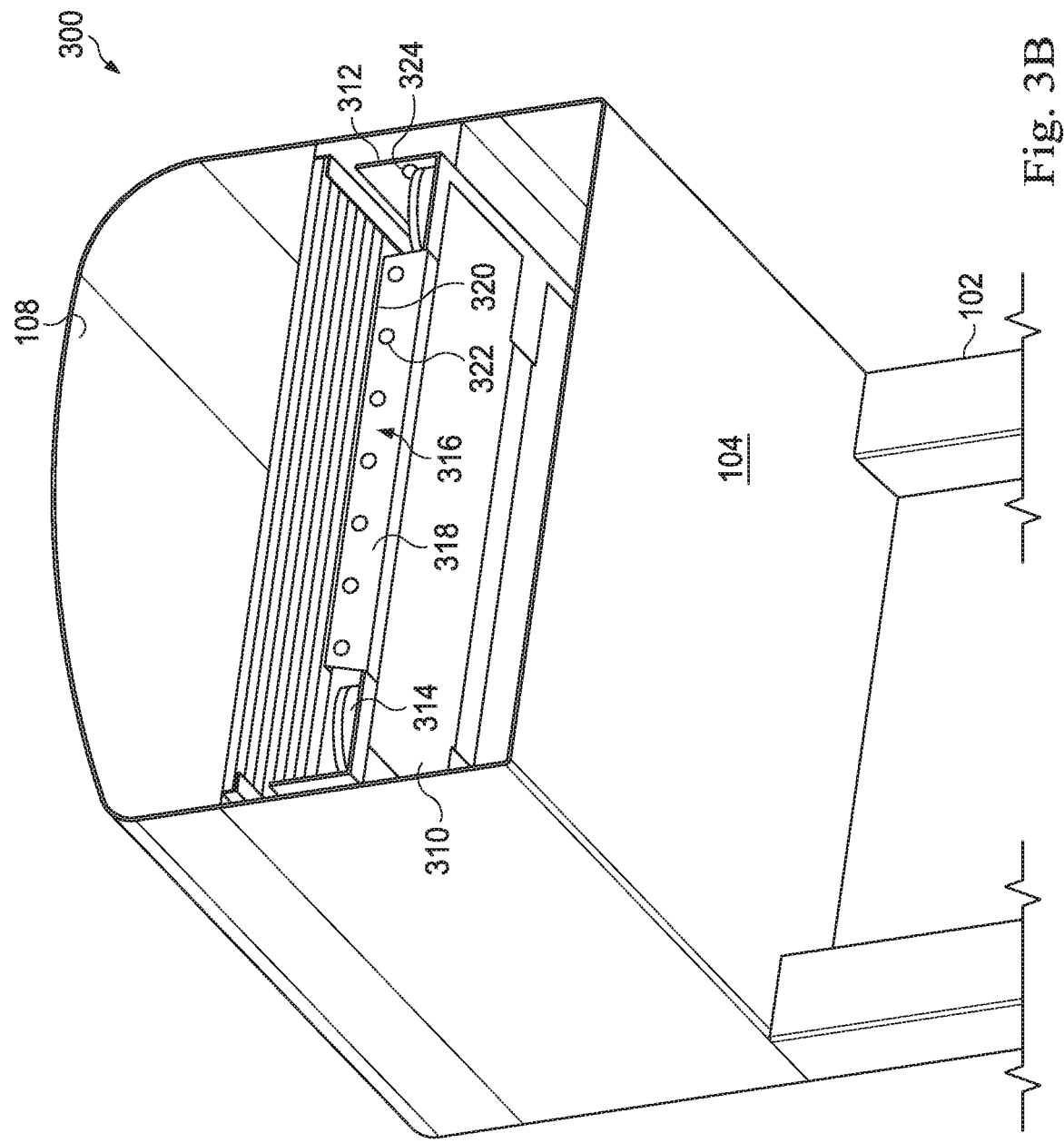
FIG. 3B is an inferior perspective cutaway view of the grill of FIG. 3A rotated approximately 60 degrees.
Figure 3C:
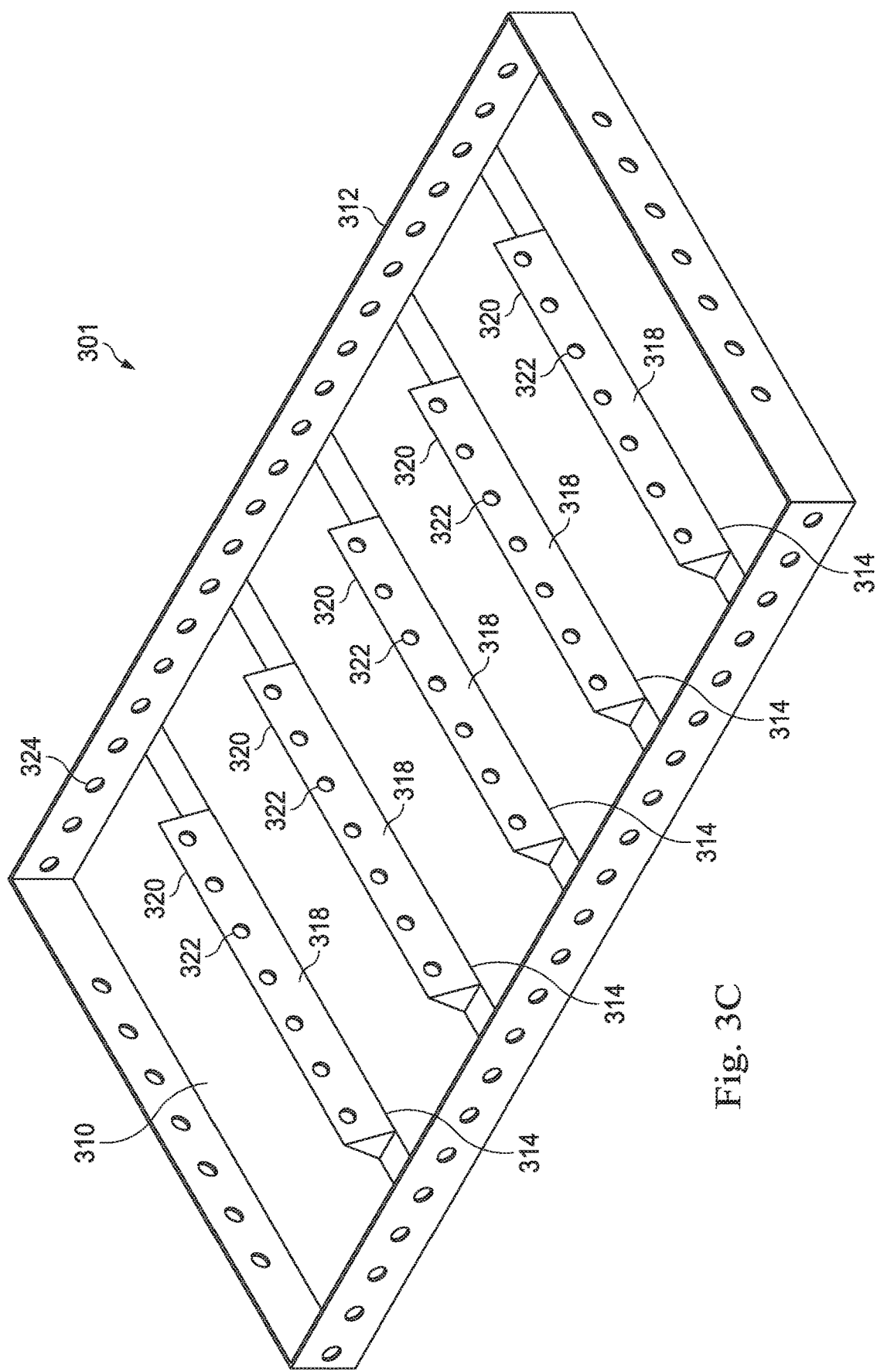
FIG. 3C is a perspective view of a charcoal pan for use with the grill of FIGS. 3A-3B.
Figure 3D:
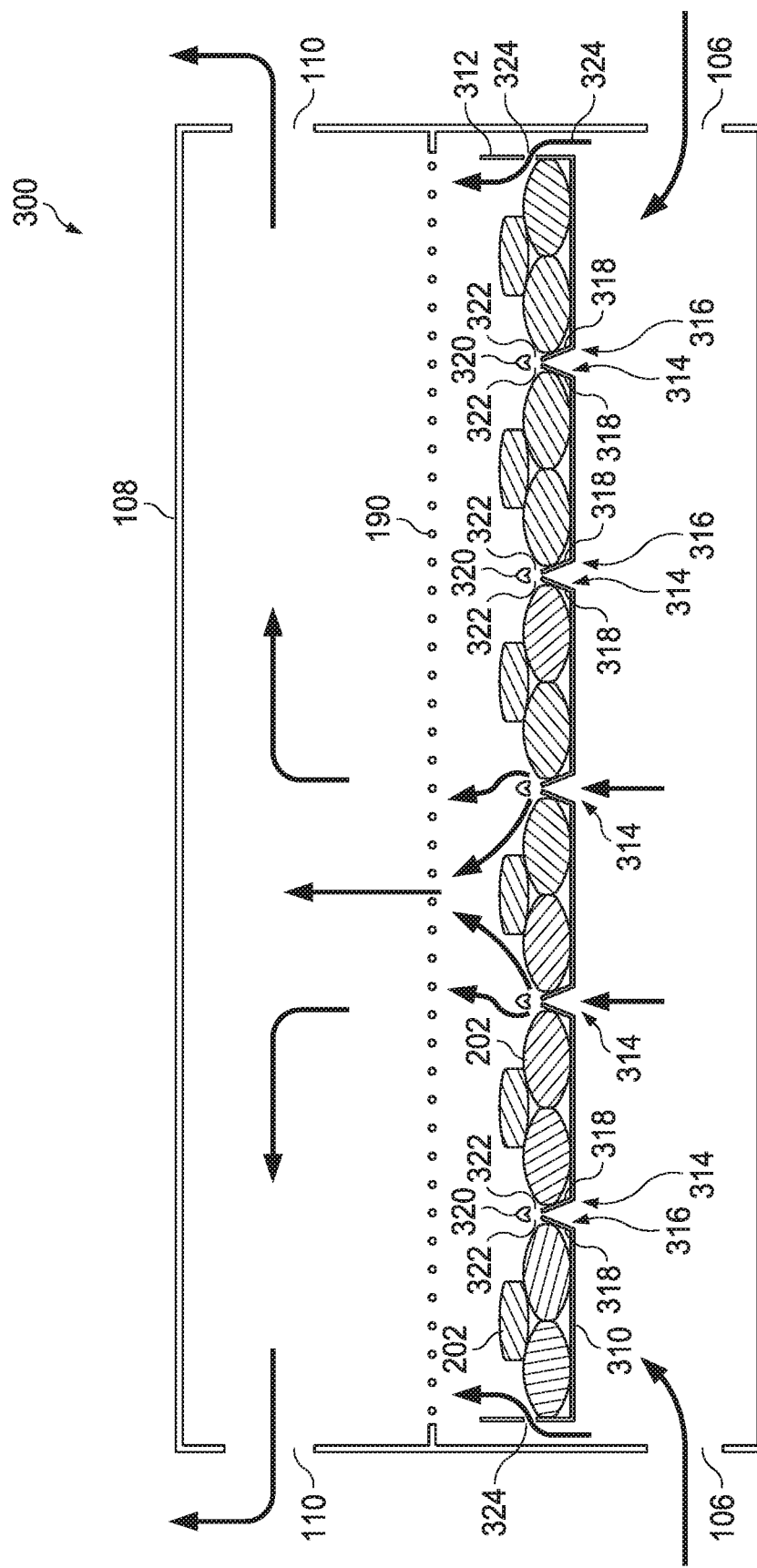
FIG. 3D is a front cutaway view of the grill of FIG. 3A.
Figure 3E:
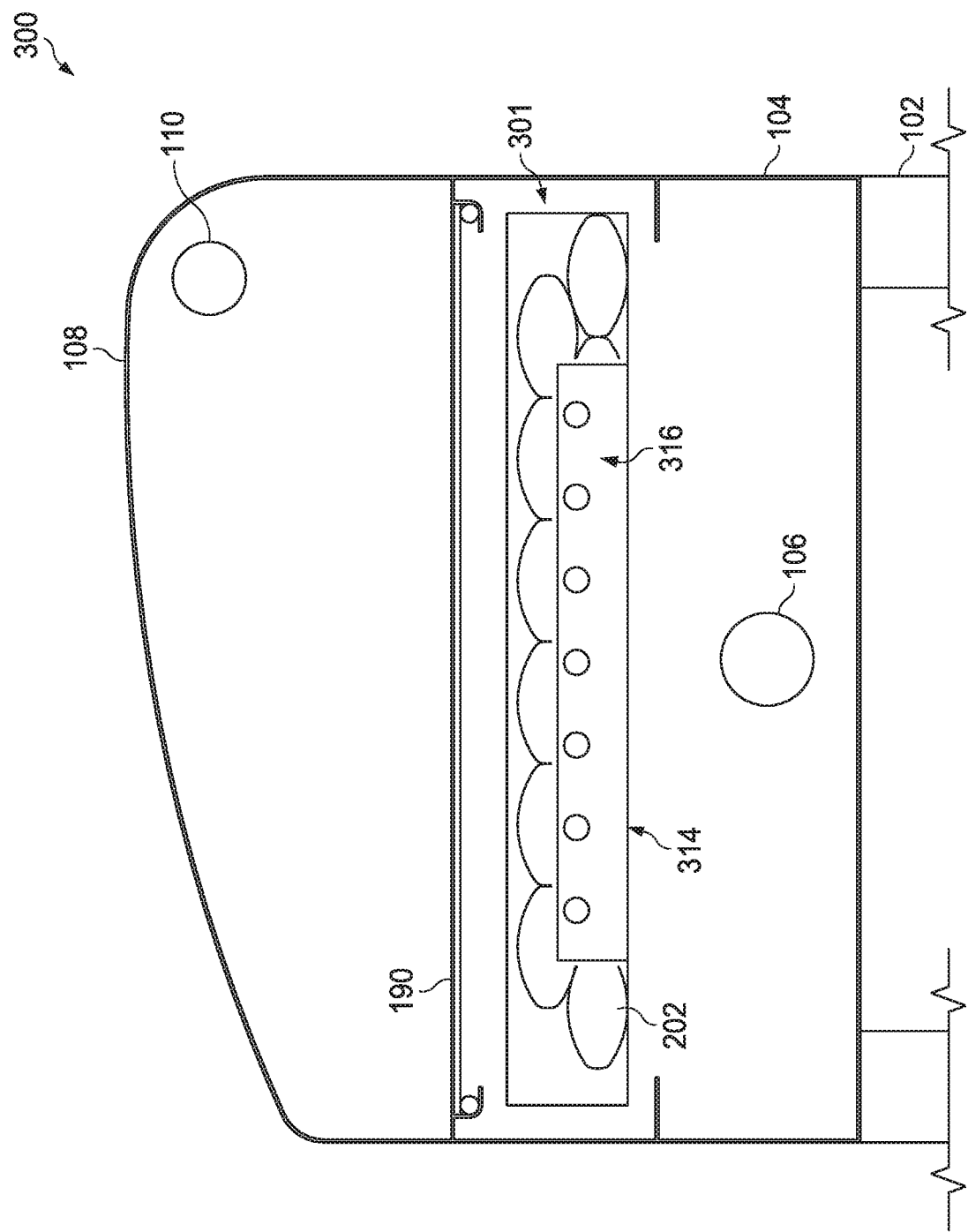
FIG. 3E is a side cutaway view of the grill of FIG. 3A.

Referring now to FIG. 3A, an inferior perspective cutaway view of a cooking grill 300 according to aspects of the present disclosure is shown. FIG. 3B is an inferior perspective cutaway view of the grill 300 of FIG. 3A rotated approximately 60 degrees. FIG. 3C is a perspective view of a charcoal pan 301 for use with the grill 300 of FIGS. 3A-3B. FIG. 3D is a front cutaway view of the grill 300, while FIG. 3E is a side cutaway view of the grill 300. Taken together, these drawings illustrate an embodiment of a grill 300 that, like the grill 100 previously described, provides enhanced burning characteristics when cooking with solid fuels (e.g., charcoal).

The exterior of the grill 300 is substantially similar to that of the grill 100 of FIG. 1. The charcoal pan 301 is adaptable to a wide variety of shapes and configurations in order to fit within the applicable firebox. The illustrated embodiment of the charcoal pan 301 (e.g., FIG. 3C) provides a rectilinear shape such as is be suitable for a firebox having a width greater than its length. The charcoal pan 301 is built upon a substantially flat and planar support surface 310 for supporting a bed of charcoal 202. A wall 312 may be formed around the perimeter of the support surface 310 to aid in retention of the briquettes forming the charcoal bed 202. The wall 312 provides a series of openings or apertures 324 that provide airflow to the top of the charcoal bed 202.

Rising from the support surface 310 is a plurality of air diffusers 314. The diffusers 314 may comprise a pair of sidewalls 318 angled upward from the support surface to form a peaked structure having an apex 320. In some embodiments, the walls 318 may be flat topped or rounded rather than joining in a peak. Below the apex 320 on each of the sidewalls 318 is a series of opening or apertures 322. The diffusers 314 each defines an air passageway 316 (best seen in the inferior views of FIGS. 3A-3B) providing air flow to and out of the openings 322.

The size and spacing of the apertures 322, 324 may vary. Generally, they may be sized and spaced so as to provide airflow while retaining the charcoal. Although briquettes would be unlikely to escape or spill through an aperture 322, 324, even if piled very high, lump charcoal has a much more random distribution of sizes, which may mean use of smaller apertures 322, 324 is in order. Smaller apertures result in less air flow per individual aperture so the spacing may be decreased (e.g., the total number of apertures increased) to offset this effect. In one embodiment the apertures may be about 0.25 inches in diameter with spacing from 0.25 inches to 0.5 inches. In other embodiments the apertures may range from as small as about 0.125 inches to as large as about 0.5 inches, with spacing scaled accordingly based on performance.

As best seen in FIG. 3D, the apertures 322 in the diffusers 314 and the apertures 324 in the wall 312 are defined at a height sufficiently above the supporting surface 310 so as to provide air flow at least to the top of the first layer of charcoal briquettes of the charcoal bed 202. In one embodiment, these apertures 322, 324 are located about 0.5 inches to about 1 inch above the support surface 310. A 1 inch height allows air flow to reach the top of a layer of charcoal briquettes from most or all manufacturers. The various embodiments of the present disclosure may also be used with lump charcoal although with slightly less control over where in the layers of the charcoal bed the air reaches given the more random size distribution of lump charcoal.

Spacing between the diffusers 314 (from adjacent walls 318 of adjacent diffusers 314) may be from about 4 inches to about 5 inches, which allows for two standard size briquettes to be placed between adjacent diffusers. The spacing between diffusers 314 and the perimeter wall 312 may also be from about 4 to about 5 inches for the same charcoal briquette accommodation.

As best seen in FIG. 3C, the diffusers 314 may be arranged on the support surface 310 aligned front to back in a parallel array. Diffusers 314 may also be aligned side to side and parallel in an array. Diffusers 314 may also be arranged in other shapes provided the 4 to 5 inch spacing is observed.

FIG. 3D illustrates an exemplary manner of airflow through and around the charcoal pan 301. Air entering through intakes 106 is drawn through the support surface via air conduits 316 terminating in apertures 322 at or near at least the first layer of the charcoal bed 202. Air may also flow in over the burning charcoal bed 202 through apertures 324 in the perimeter wall 312. Again, this allows the charcoal bed 202 to burn from the top down increasing heat output and decreasing flying ash.

Figure 4A:
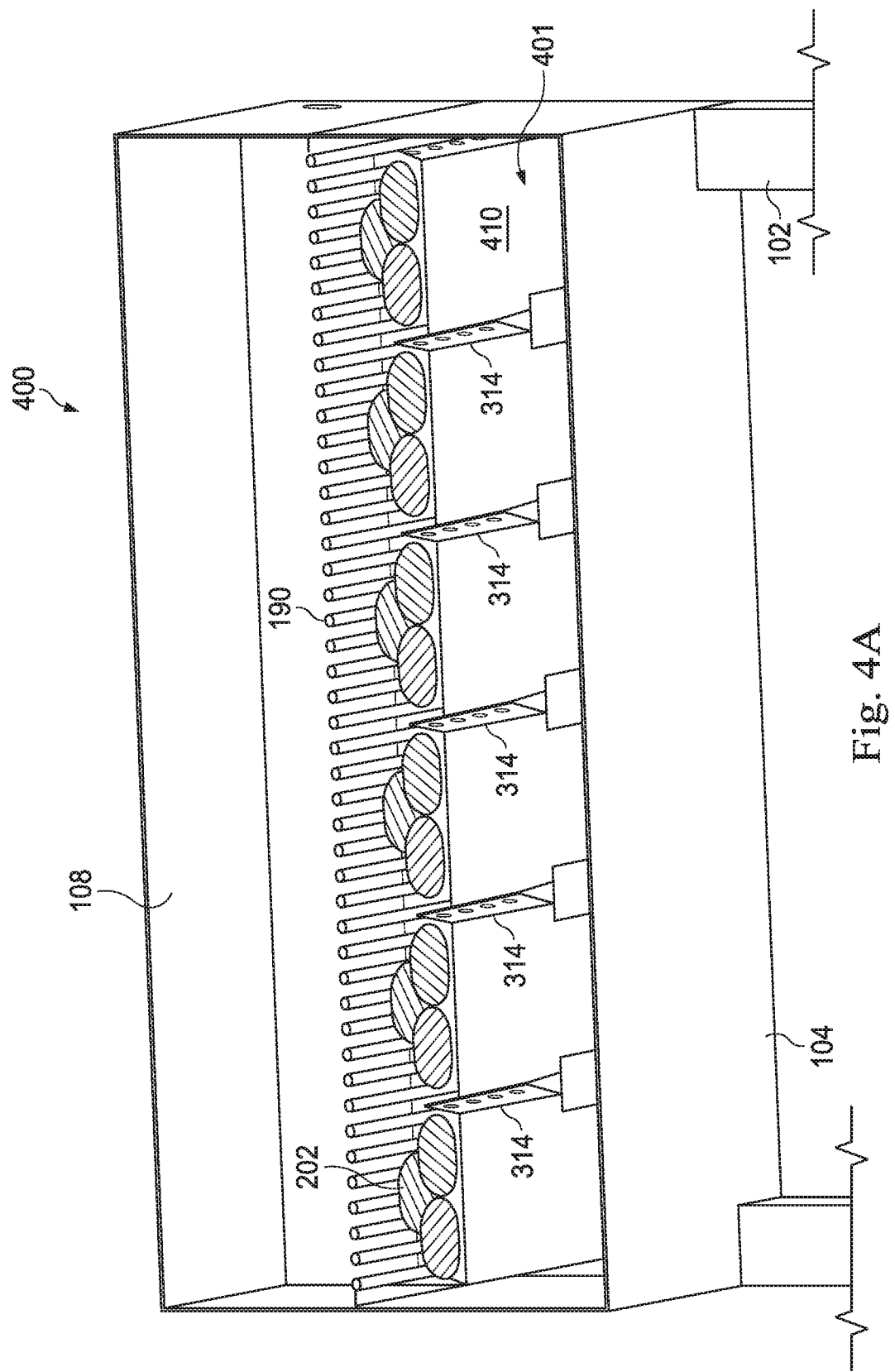
FIG. 4A is an inferior perspective cutaway view of a cooking grill according to aspects of the present disclosure.
Figure 4B:
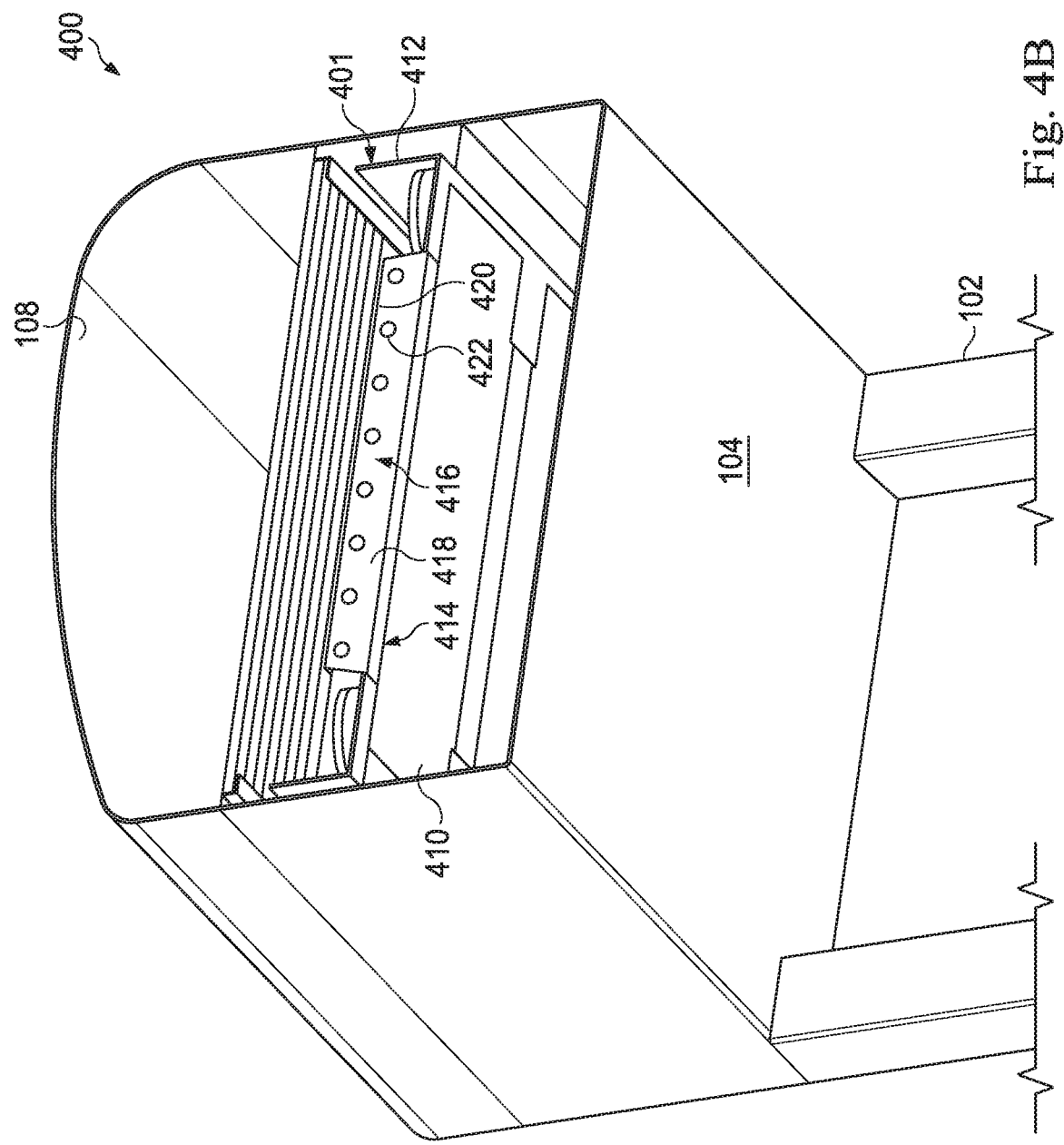
FIG. 4B is an inferior perspective cutaway view of the grill of FIG. 4A rotated approximately 60 degrees.
Figure 4C:
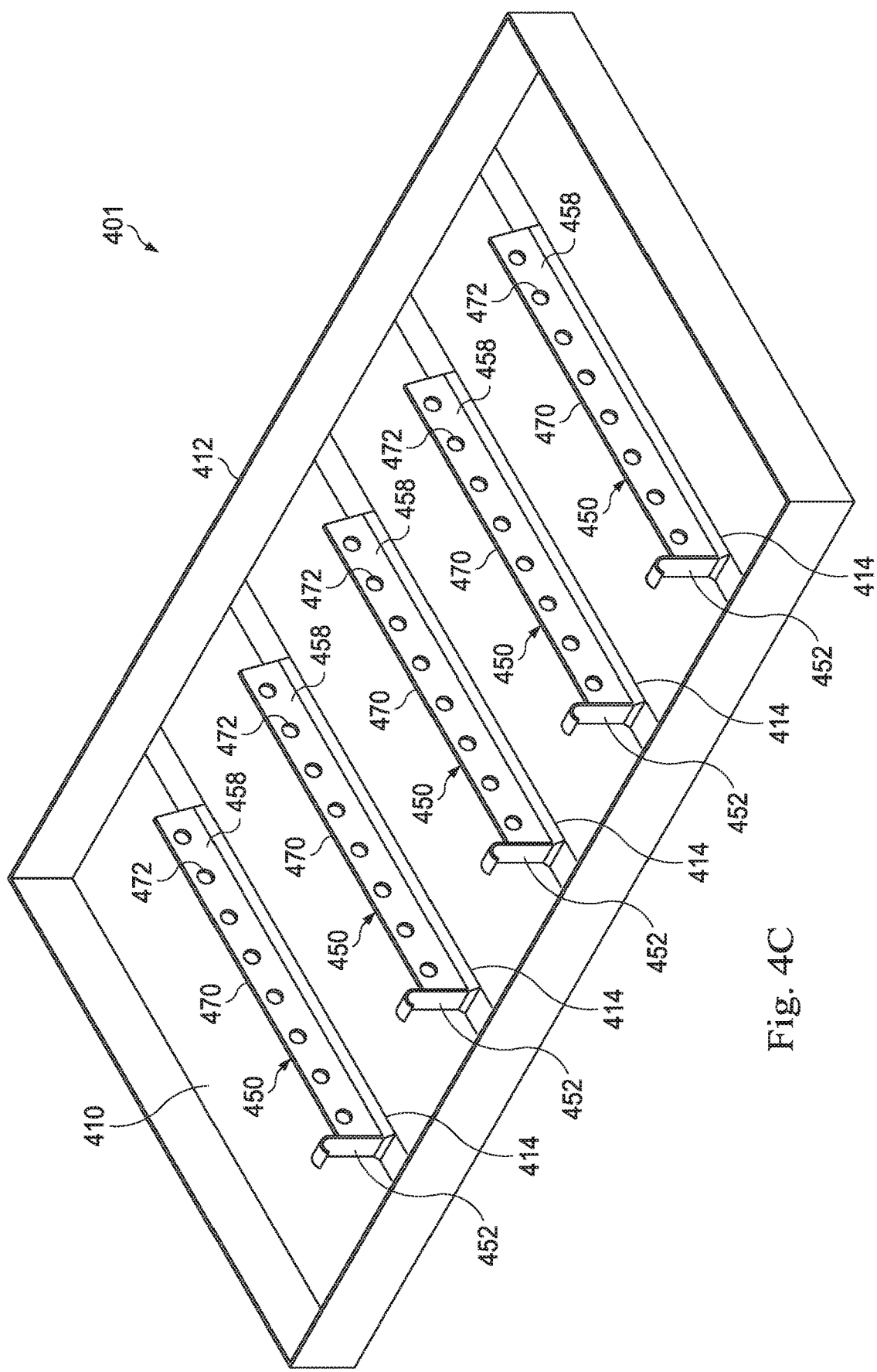
FIG. 4C is a perspective view of a charcoal pan for use with the grill of FIGS. 4A-4B.
Figure 4D:
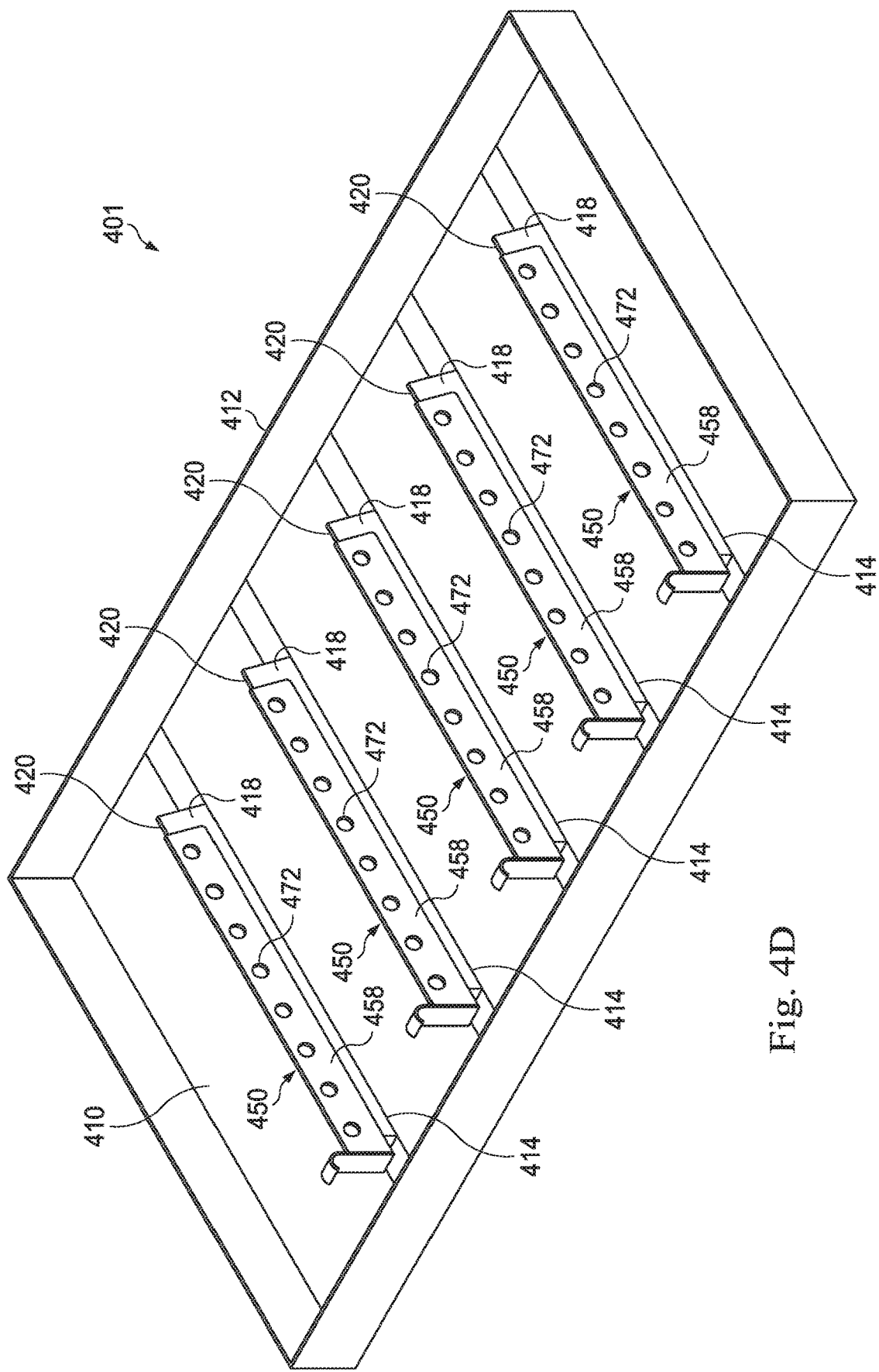
FIG. 4D is a perspective view of the charcoal pan of FIG. 4C shown with air diffusers closed.
Figure 4E:
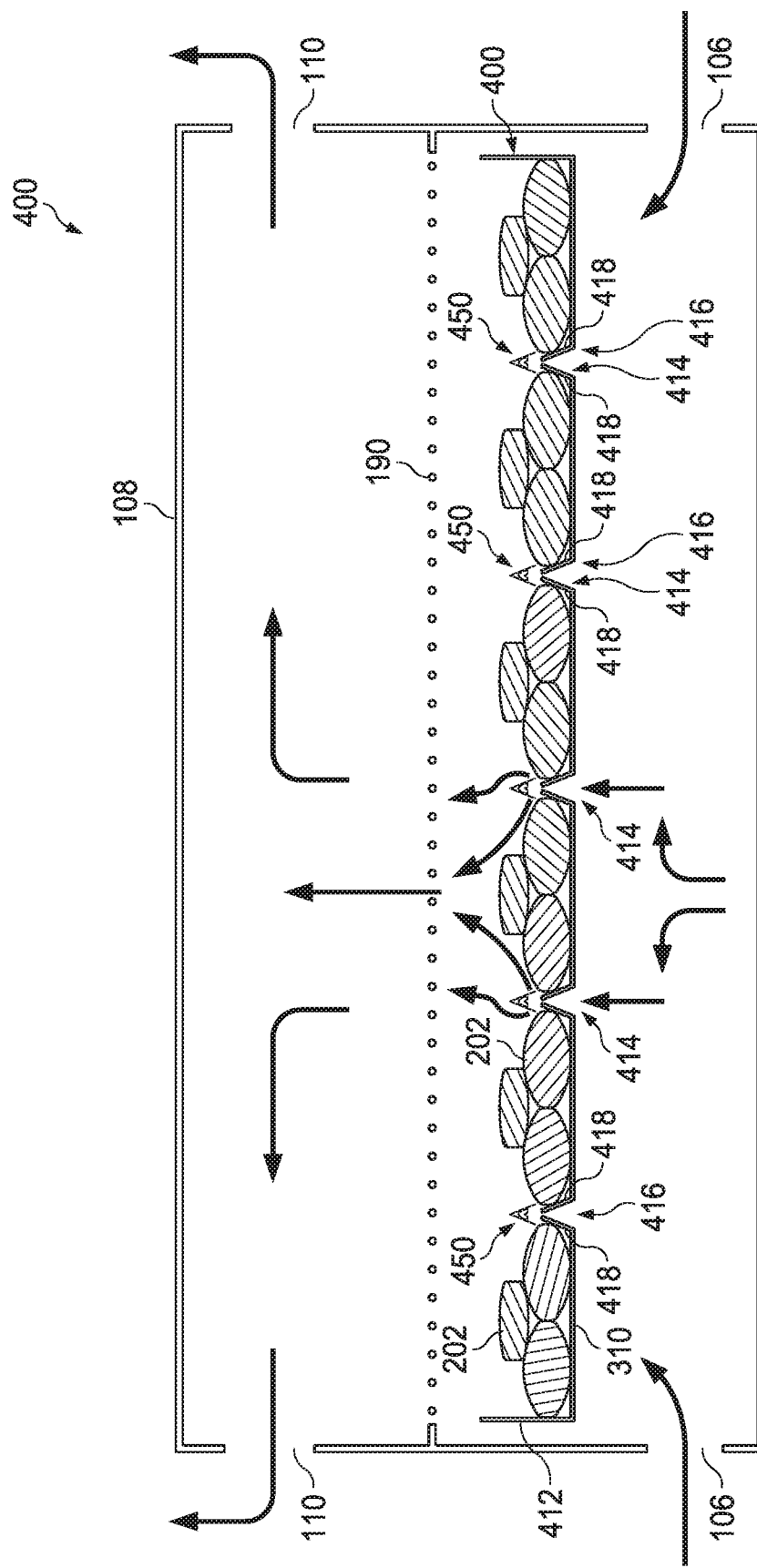
FIG. 4E is a front cutaway view of the grill of FIG. 4A.
Figure 4F:
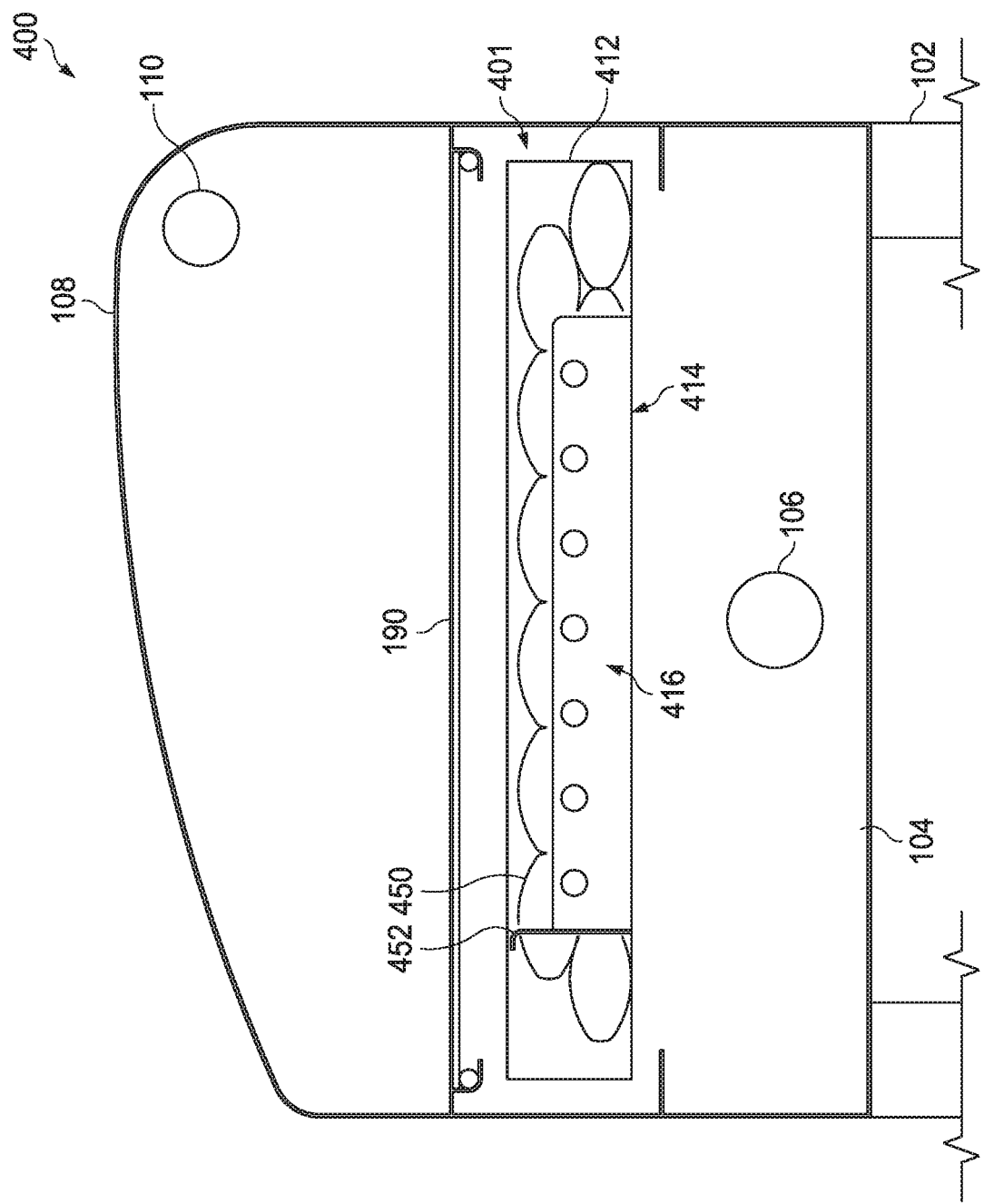
FIG. 4F is a side cutaway view of the grill of FIG. 4A.

Referring now to FIG. 4A, is an inferior perspective cutaway view of a cooking grill 400 according to aspects of the present disclosure is shown. FIG. 4B is an inferior perspective cutaway view of the grill 400 of FIG. 4A rotated approximately 60 degrees. FIG. 4C is a perspective view of a charcoal pan 401 for use with the grill of FIGS. 4A-4B. FIG. 4D is a perspective view of the charcoal pan 400 of FIG. 4C shown with air diffusers 414 closed. FIG. 4E is a front cutaway view of the grill 400 while FIG. 4F is a side cutaway view of the grill 400.

The exterior of the grill 400 is substantially similar to those previously described. The layout of the charcoal pan 401 is somewhat similar as well. A support surface 410 for resting a bed of charcoal 202 is provided and may be bounded by a perimeter wall 412. The overall shape of the pan 401 may be rectilinear or rounded to depend upon the shape of the firebox in which it is employed.

A plurality of diffusers 414 is arrayed on the support surface 410. As shown in FIGS. 4C-4D, the diffusers are aligned front to back with respect to the charcoal pan 401 but other configurations are possible as previously described. The diffusers 414 are adjustable via a sliding adjustment mechanism 450. As best seen in FIGS. 4A-4B the diffusers 414 comprise a pair of upwardly angled walls 418. The walls 418 may form a peaked structure with an apex 420. The walls 418 each define a plurality of apertures 422 that are spaced apart from (e.g., above) the support surface 410. The walls 418 thus define an air conduit 416 allowing air to pass from below the support surface 410 to an area at or above a charcoal bed 202 resting on the support surface 410.

Best seen with reference to FIGS. 4C-4D, the sliding adjusters 450 may be provided with a handle 452 allowing them to be moved back and forth on the walls 418. In some embodiments, some or all of the handles 452 are linked together to allow for easy and consistent adjustments. The adjusters 450 may overlap the walls 418 and have a similar shape so as to allow the peaked structure of the walls 418 below to nest in the adjuster 450. Therefore the adjusters 450 may also form a peaked structure with walls 458 joining at an apex 470. The walls 458 may define a plurality of apertures 472. These may be of similar size, shape, and spacing as the apertures 422 in the walls 418. The adjusters 450 may be moved such that the apertures 472 align with the apertures 422 of the walls 418 below. In FIG. 4C the air conduit 416 is completely open and functions to provide full air flow to the charcoal bed 202. On the other hand, as shown in FIG. 4D, the adjusters 450 may be slid along the respective walls 418 such that there is no overlap between apertures 422 and apertures 472. Perhaps of greater use in controlling rate of burn of the charcoal bed 202, the diffusers 418 may be partially opened by moving the adjusters 450 such that there is partial overlap between the apertures 422, 472 such that an intermediate airflow is achieved.

FIG. 4E illustrates an exemplary airflow within the grill 400 when the adjusters are open. Here again, air from the intakes 106 is allowed to flow upward through the air conduits 416 and to the top of at least the first layer of the charcoal bed 202. The apertures 422, 472 may be arranged vertically to be from about 0.5 inches to about 1 inch above the support surface to accommodate standard charcoal briquettes. The diffusers 414 may be spaced apart from one another about 4 inches to about 5 inches (from adjacent walls 418 of adjacent diffusers 414) to accommodate the width of at least two standard sized charcoal briquettes. In this and other embodiments, the spacing between the end diffusers 414 and the wall 412 may be similar to the inter diffuser spacing.

Figure 5A:
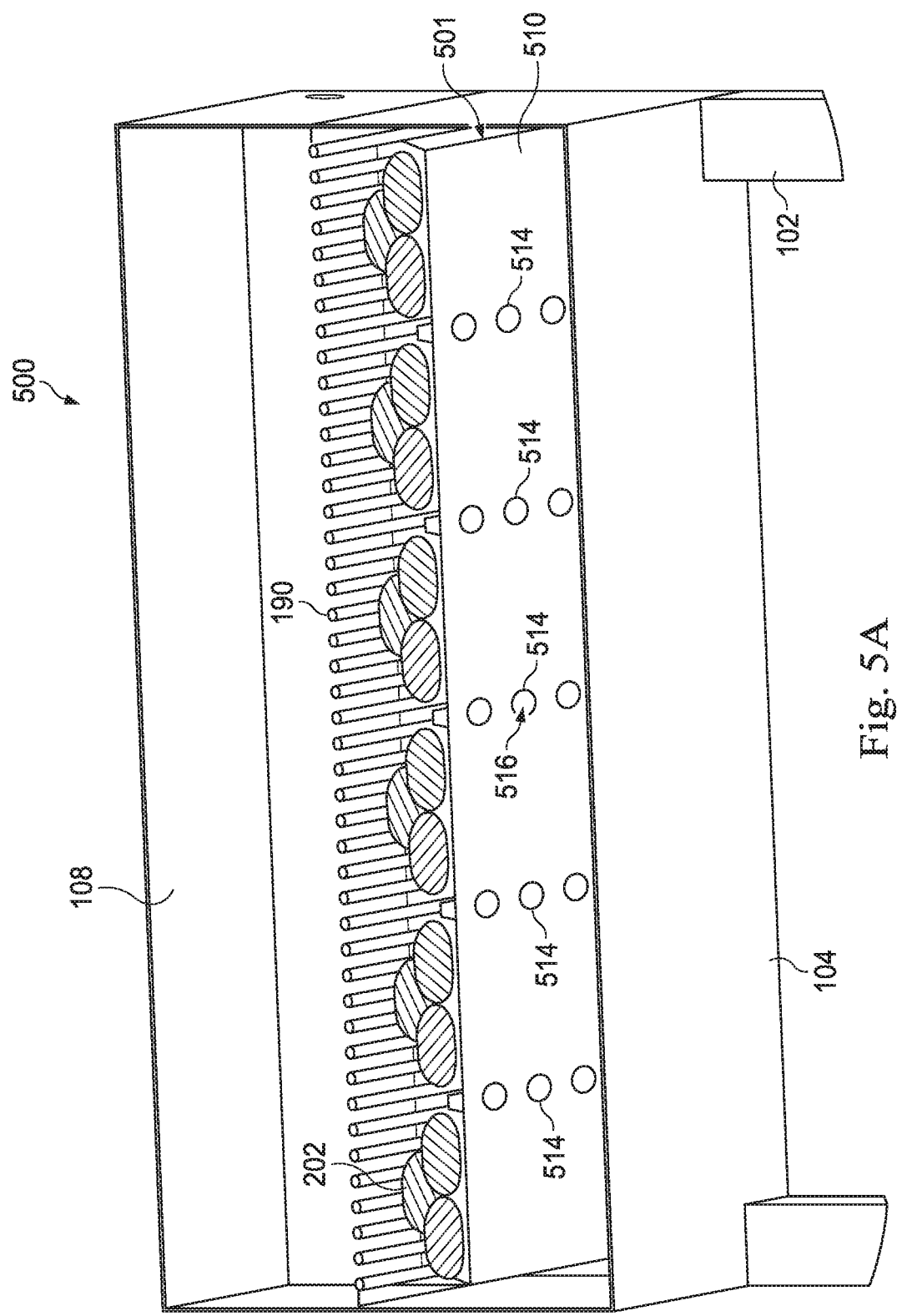
FIG. 5A is an inferior perspective cutaway view of a cooking grill according to aspects of the present disclosure.
Figure 5B:
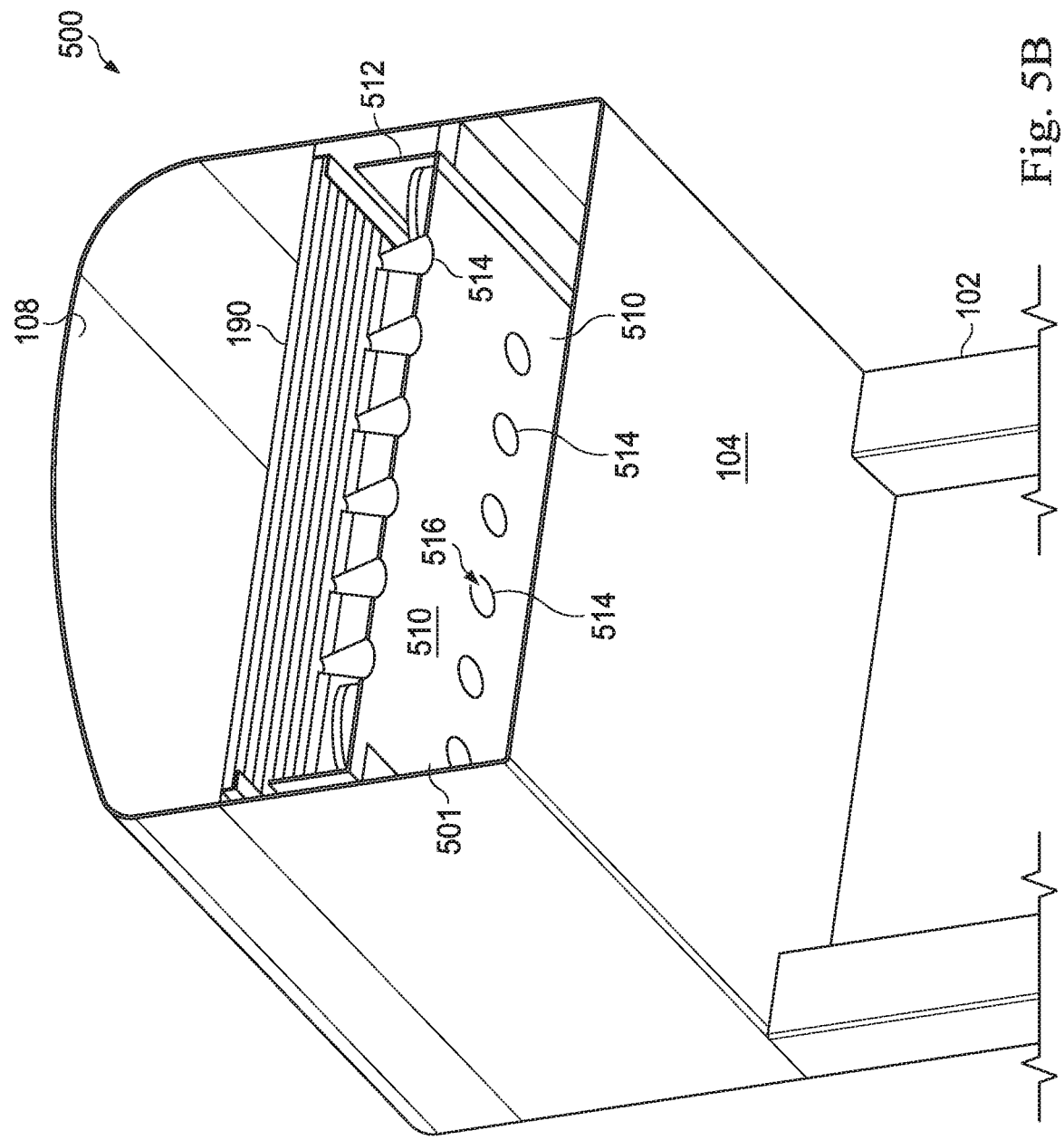
FIG. 5B is an inferior perspective cutaway view of the grill of FIG. 5A rotated approximately 60 degrees.
Figure 5C:
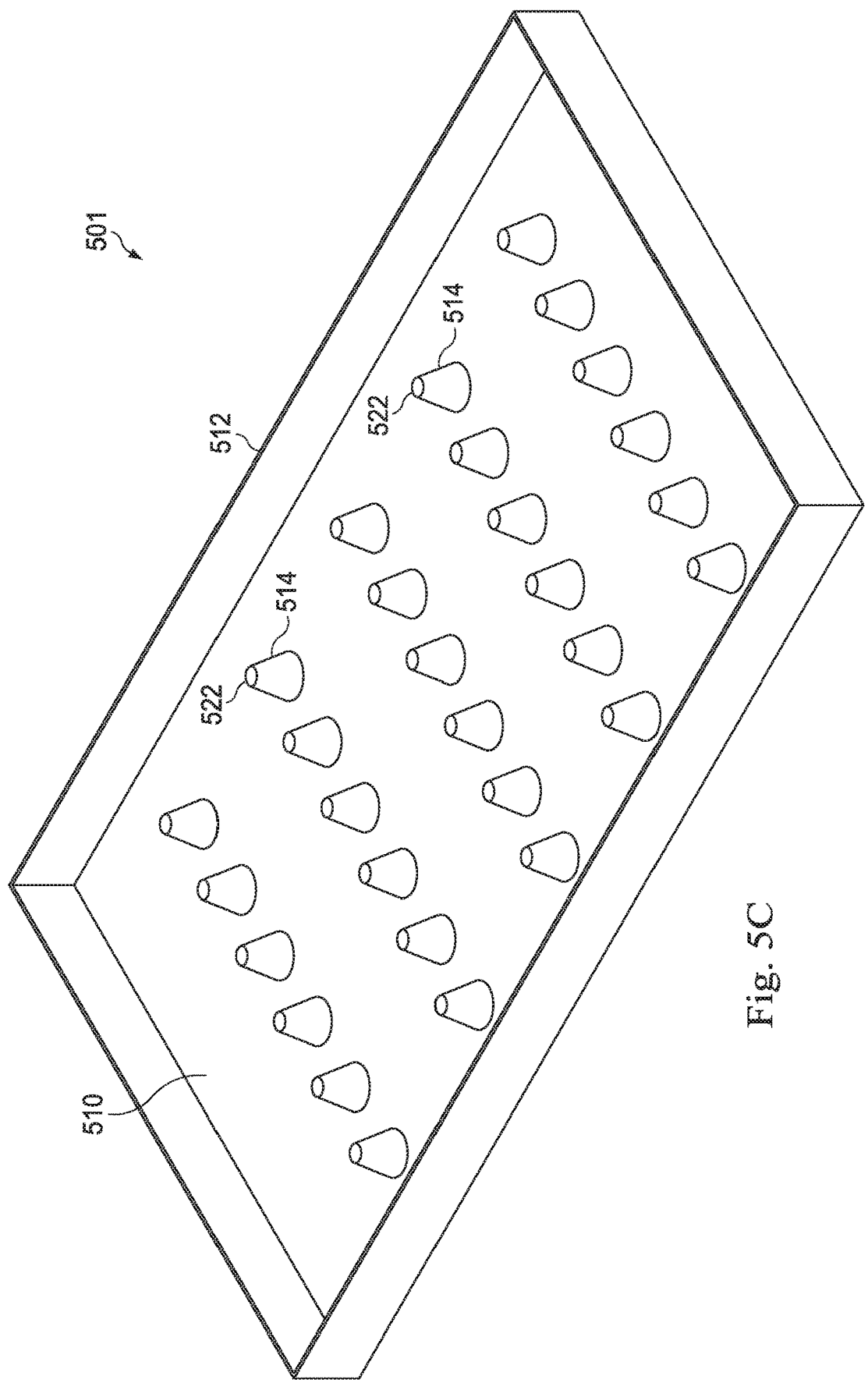
FIG. 5C is a perspective view of a charcoal pan for use with the grill of FIGS. 5A-5B.
Figure 5D:
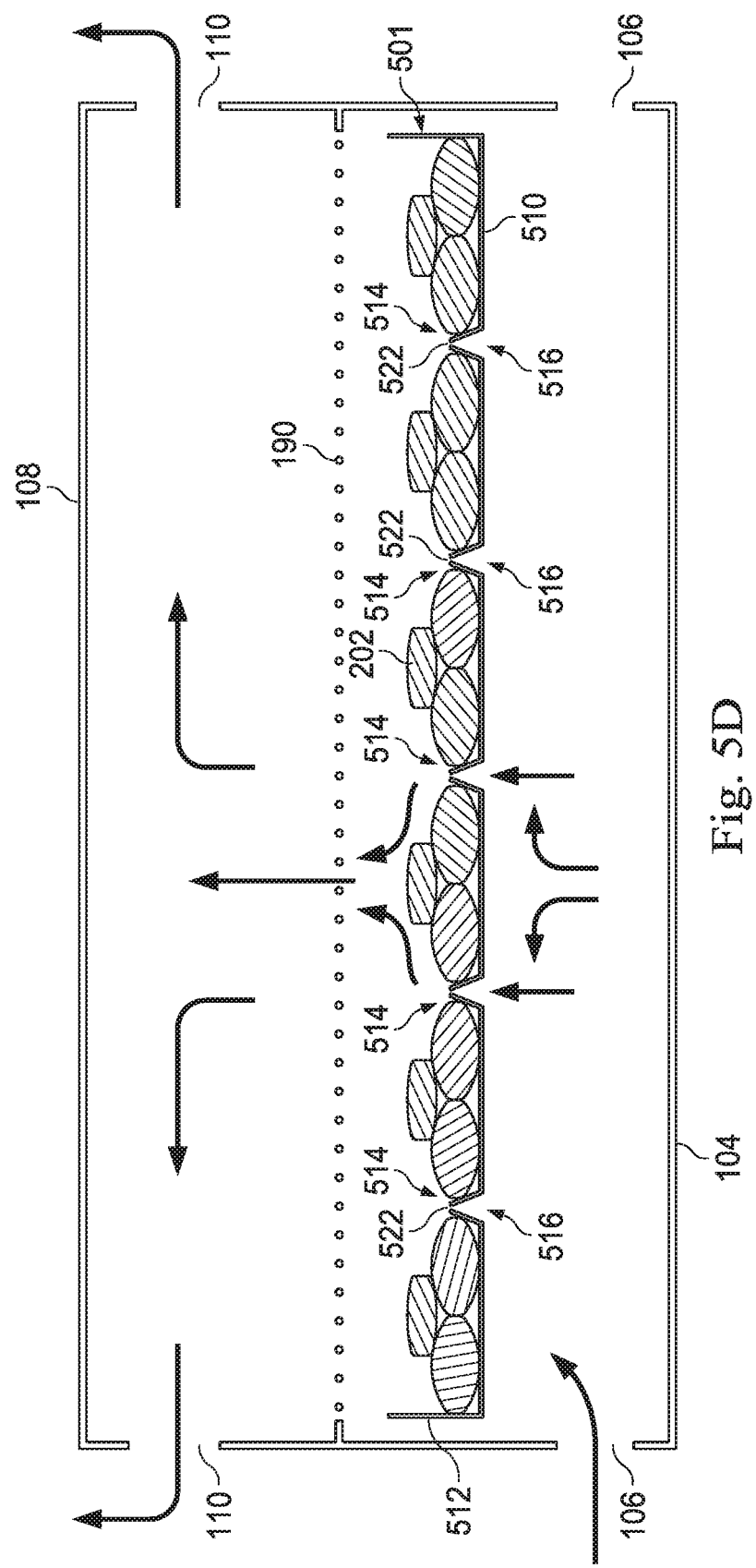
FIG. 5D is a front cutaway view of the grill of FIG. 5A.

Referring now to FIG. 5A, an inferior perspective cutaway view of a cooking grill 500 according to aspects of the present disclosure is shown. FIG. 5B is an inferior perspective cutaway view of the grill 500 of FIG. 5A rotated approximately 60 degrees. FIG. 5C is a perspective view of a charcoal pan 501 for use with the grill of FIGS. 5A-5B. FIG. 5D is a front cutaway view of the grill 500 while FIG. 5E is a side cutaway view of the grill 500.

As with previous embodiments, the exterior of the grill 500 is substantially similar to the grill 100 discussed above. The grill 500 utilizes a charcoal pan 501 providing a substantially flat or planar supporting surface 510 capable of retaining and supporting a charcoal bed 202. The supporting surface 510 may be bounded by a perimeter wall 512. The illustrated embodiment of the charcoal pan 501 is rectilinear but other embodiments may be configured to fit into oval or rounded fireboxes. A plurality of diffusers 514 define air passageways or conduits 516 from below the supporting surface 510 to an area at or above a portion of the charcoal bed 202 (as best seen in FIG. 5D). In the present embodiment the diffusers are conic sections terminating in an air opening 522. The height of the air openings 522 relative to the support surface 510 may be from about 0.5 inches to about 1 inch to accommodate at least one layer of standard charcoal briquettes on the supporting surface 510.

As can be seen in FIG. 5C, the diffusers 514 may be lined up front to back in parallel lines. Distances between the diffusers 514 arranged in parallel lines may range from about 4 inches to about 5 inches to accommodate at least two charcoal briquettes side by side (e.g., as seen in FIG. 5D). The diffusers 514 may also be arranged on parallel lines running from one side of the pan 501 to the other. In other embodiments, the diffusers 415 may be equidistantly spaced in a grid or other repeating pattern.

FIG. 5D illustrates exemplary airflow within the grill 500. The diffusers 514 operate to transport air flow from below the pan 501 to an area above at least a portion of the charcoal bed 202 in order to promote burning from the top of the bed downward and to reduce the chance of ash contacting food cooking on the food grate 190.

Figure 6A:
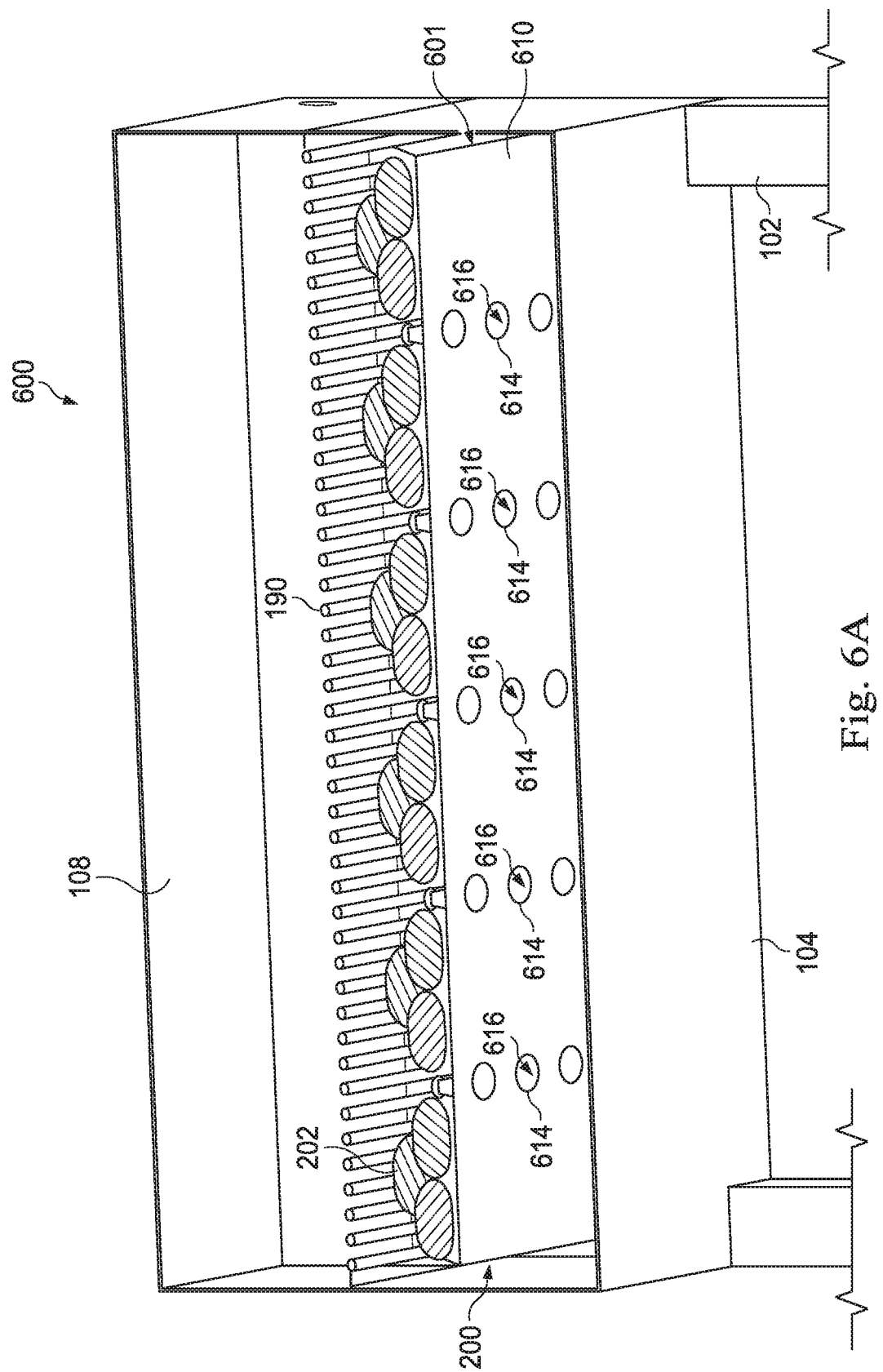
FIG. 6A is an inferior perspective cutaway view of a cooking grill according to aspects of the present disclosure.
Figure 6B:
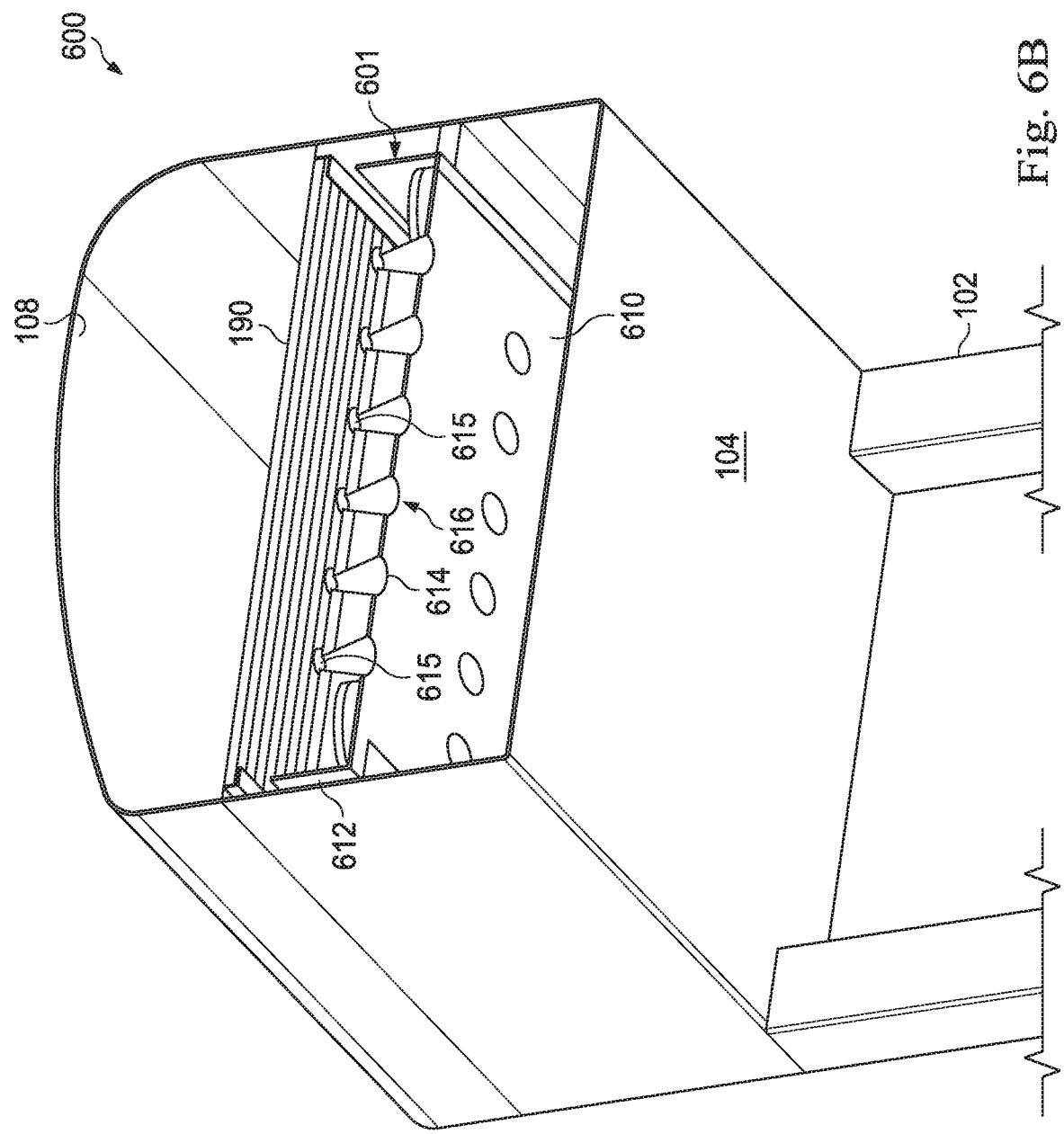
FIG. 6B is an inferior perspective cutaway view of the grill of FIG. 6A rotated approximately 60 degrees.
Figure 6C:
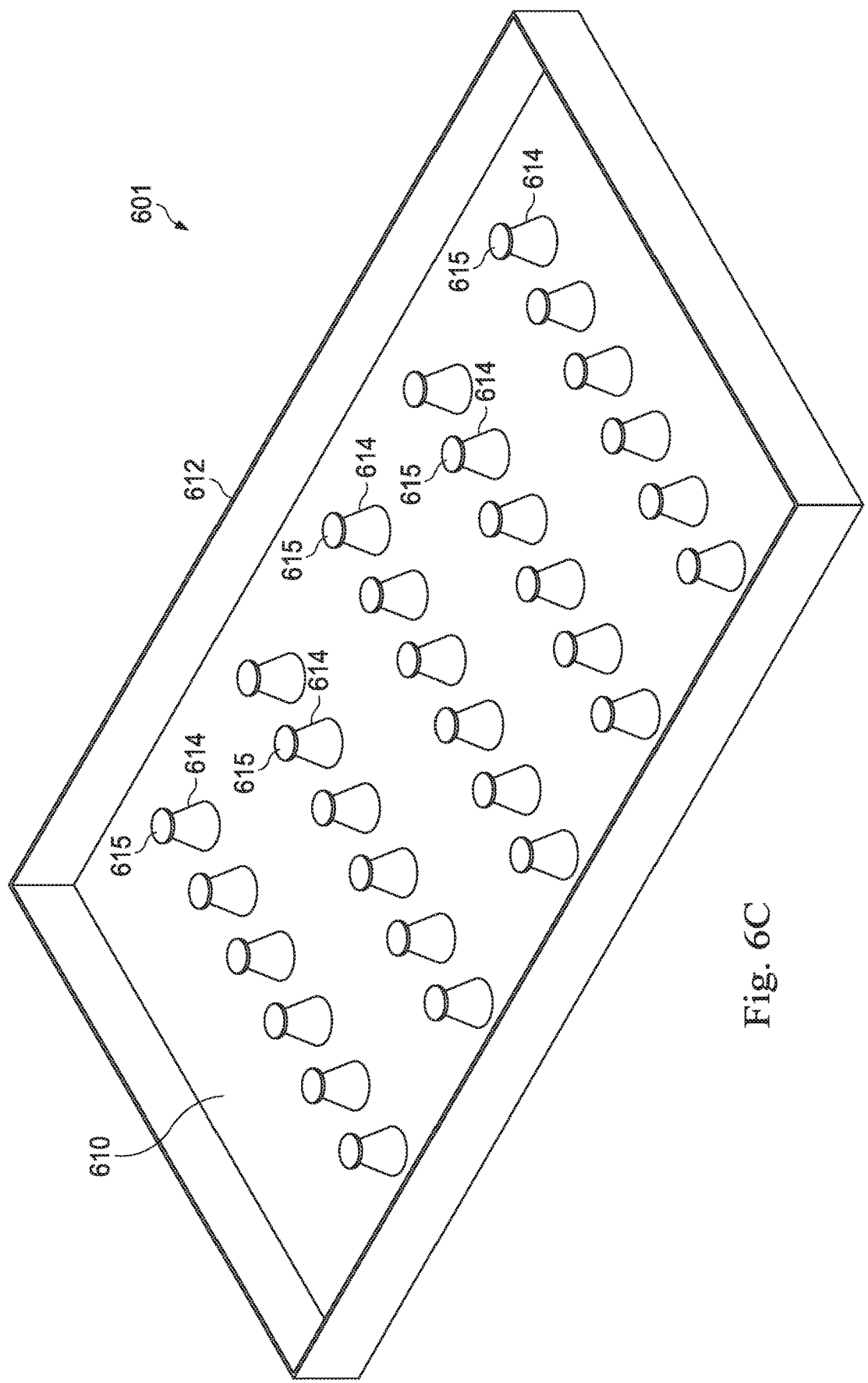
FIG. 6C is a perspective view of a charcoal pan for use with the grill of FIGS. 6A-6B.
Figure 6D:
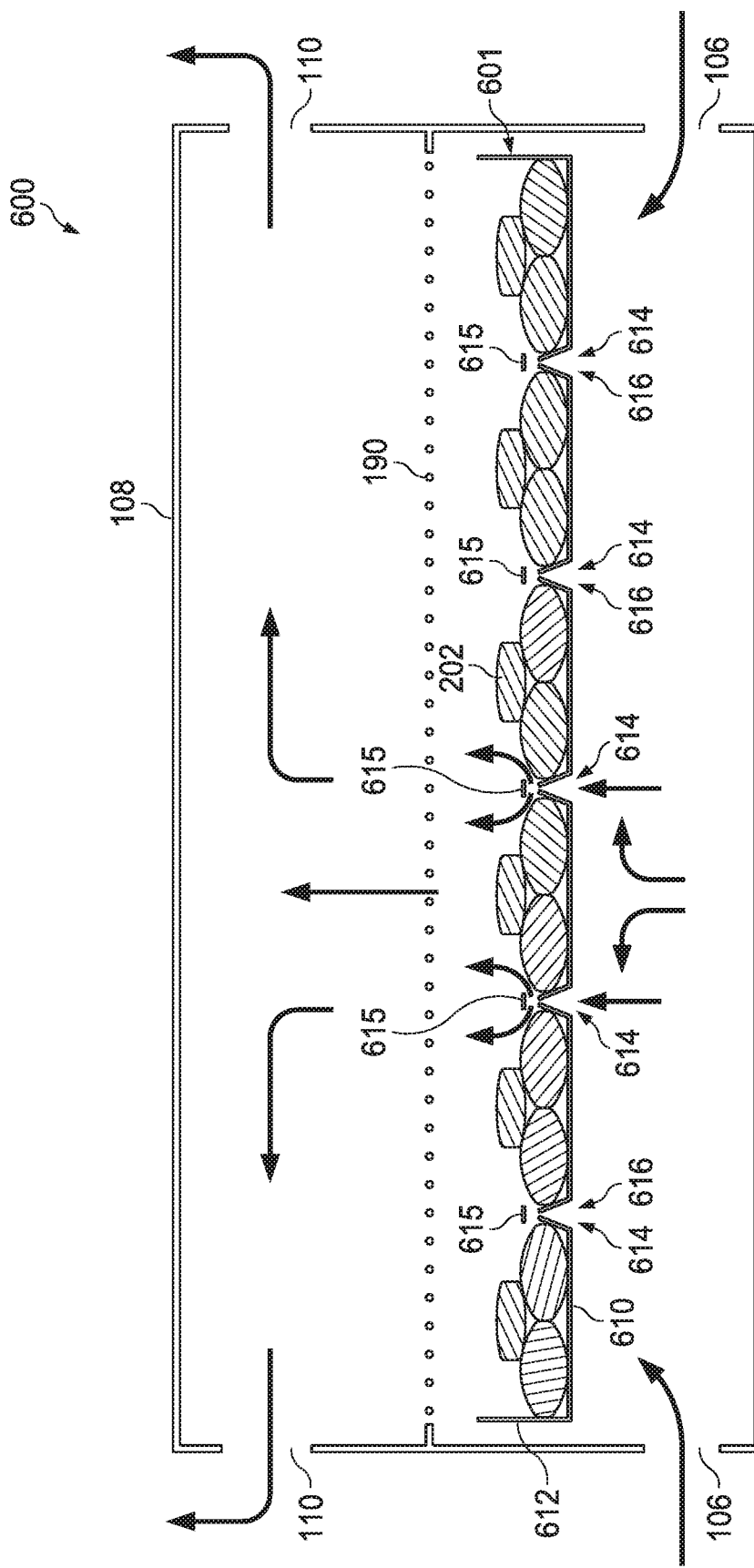
FIG. 6D is a front cutaway view of the grill of FIG. 6A.
Figure 6E:
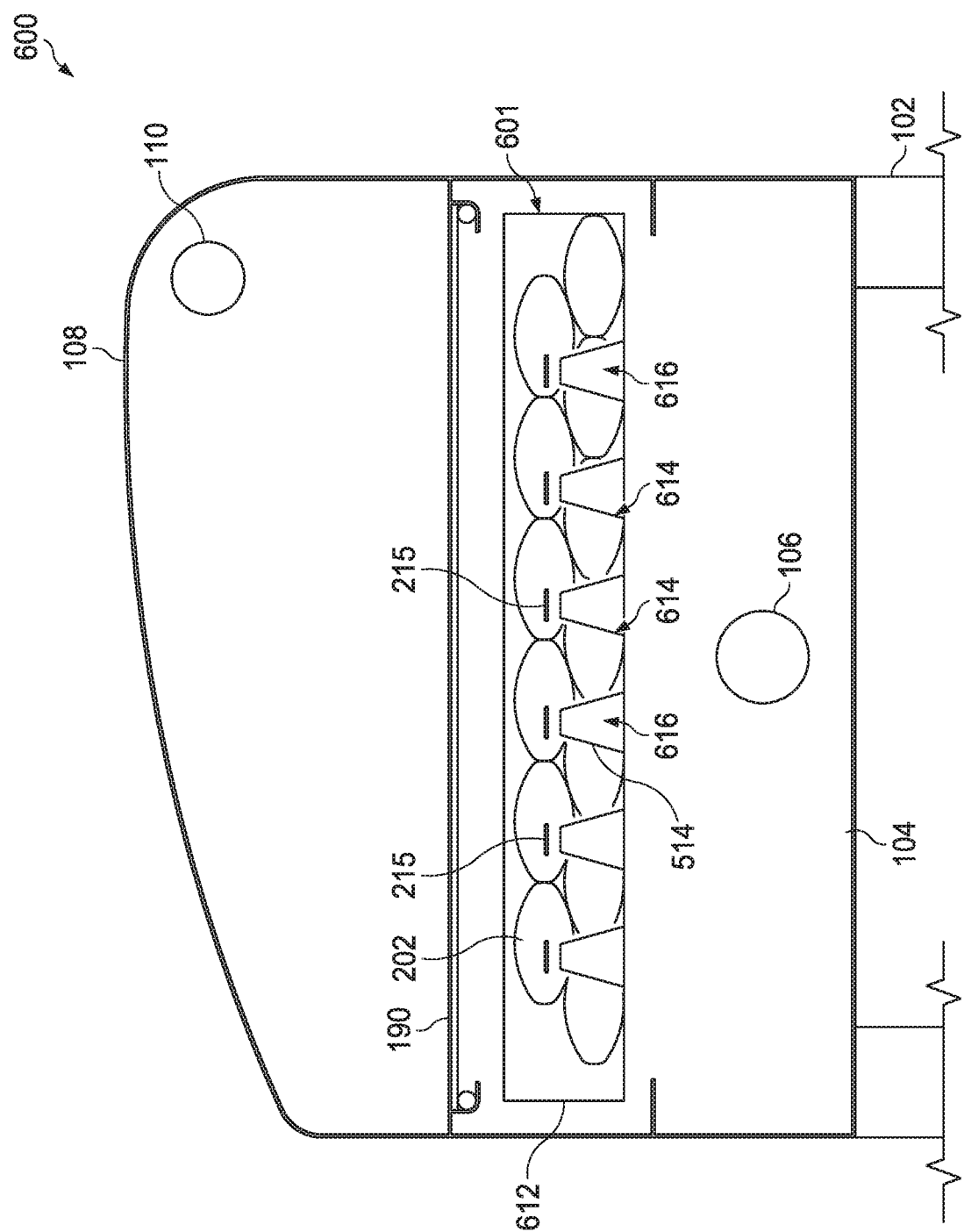
FIG. 6E is a side cutaway view of the grill of FIG. 6A.

Referring now to FIG. 6A, an inferior perspective cutaway view of a cooking grill 600 according to aspects of the present disclosure is shown. FIG. 3B is an inferior perspective cutaway view of the grill 500 of FIG. 6A rotated approximately 60 degrees. FIG. 6C is a perspective view of a charcoal pan 601 for use with the grill 600 of FIGS. 6A-6B. FIG. 6D is a front cutaway view of the grill 600 and FIG. 6E is a side cutaway view of the grill 600.

The grill 600, and particularly the grill pan 601, is similar to the components described above with respect to the grill 500 of FIGS. 5A-5E. The grill pan 601 provides a plurality of conic diffusers 614 defining a conduit 616 from below a support surface 610 to a height above the support surface 610 equal to or greater than a standard charcoal briquette. An opening 622 in the top of the diffusers 614 may be from about 0.5 inches to about 1 inch above the support surface 610. The arrangement of the diffusers 614 on the support surface 610 may be altered from that shown as discussed above with respect to the charcoal pan 501 of grill 500. Spacing between diffusers 614 (or rows of diffusers 614) may range from about 4 inches to about 5 inches.

Some or all of the diffusers 614 are provided with a cap 615 to be placed over the top of the diffuser 614 but not to plug the openings 622. In this way, the caps 615 can serve to prevent fat, drippings, and/or other debris from the cooking grill 190 from falling past the charcoal pan 601 and down into the firebox 104. A tab, riser, or other linkage (not shown) may locate each cap 615 with respect to its associated diffuser 614. FIG. 6D illustrates possible airflow through the charcoal pan 601 and around the caps 615 to the area above the support surface 610.

It will be appreciated that the various charcoal pans of the present disclosure (e.g., pans 200, 301, 401, 501, 601) and their associated components may be formed from machining, casting, punching, folding, spot welding, soldering and other means. In some cases, the components may be ceramic coated, or formed from sheet metals with other heat resistant coatings. The pans 200, 301, 401, 501, 601 are also suitable for use in grills that accommodate charcoal only (whether gas started or otherwise), or in grills that are convertible to utilize charcoal or gas. In some embodiments, the pans 200, 301, 401, 501, 601 are removable from the firebox 104 and it other embodiments they are affixed thereto.

As alluded to previously, one benefit of the solutions of the present disclosure is that fire burns from the top down on the charcoal bed 202, and less of the radiant heat from the burning pieces of charcoal is radiated downwards away from the grate 190 and food being cooked. This produces more efficient burning, which can translate into lower usage of charcoal. A second benefit is that the air conduits and diffuser features can be placed so as to produce the most even possible generation of heat across the bed of burning charcoal 202. A third benefit is that the placement of the ducts and diffusers can provide a short path from the air outlet at the top of the diffuser to any part of the charcoal bed 202 allowing for prompt development of the fire across the entire bed 202 following ignition.

Unexpectedly, it has also been found that there is much less tendency for grease drippings from food to ignite in the bed of burning charcoal 202 with the various embodiments of the present disclosure. Air supply to the charcoal 202 and the amount of charcoal on the bed 202 may be controlled to reduce the thermal draft. This during the operation the charcoal 202 will burn fewer open flames reducing the possibility of flare-ups. With reduced possibility of flare-ups, food can be cooked with close proximity to charcoal bed 202 which makes the grill more efficient. Cooking can be done with defined sear marks similar a gas grill with little to no ash deposit of ash on the food.

Although various embodiments of the present disclosure are described and shown as being loaded with charcoal briquettes, it is understood that the embodiments of the present disclosure may also be utilized with lump or natural charcoal with similar or identical satisfactory results and improvements.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

What is claimed is:

1. A charcoal grill comprising:
    a cooking grate;
    a firebox;
    a solid supporting surface capable of supporting a quantity of charcoal briquettes within the firebox and beneath the cooking grate without the quantity of charcoal briquettes coming into contact with the cooking grate; and
    a plurality of air diffusers each comprising a pair of opposing walls rising from the support surface to form an apex, each of the pair of opposing walls defining a plurality of open apertures below the apex that allow gas flow through the pair of opposing walls;
    wherein each of the plurality of air diffusers transport air from underneath the supporting surface to at least a portion of the quantity of charcoal briquettes below the cooking grate and above the supporting surface.

2. The charcoal pan of claim 1, wherein the plurality of air diffusers are spaced apart from 4 inches to 5 inches.

3. The charcoal pan of claim 1, wherein the supporting surface is bounded by a boundary wall defining at least one air opening therein, the at least one air opening being situated above the supporting surface.

4. A charcoal grill comprising:
    a firebox having a cooking grate;
    a solid flat support surface inside the firebox, below the cooking grate, and bounded by an outer wall;
    a plurality of air conduits defining air passageways inside the firebox from below the flat support surface and terminating above the flat support surface but below the cooking grate; and at least one air inlet into the firebox below the flat support surface;

wherein the air conduits further comprise a plurality of parallel peaked structures placed at least 4 inches apart on the flat support surface; and wherein each of the plurality of air conduits comprise conic section terminating in an air opening.

5. The charcoal pan of claim 4, wherein the outer wall defines a plurality of air openings around a periphery of the flat support surface.

* * * * *